(12) United States Patent
Toyoda

(10) Patent No.: US 10,341,604 B2
(45) Date of Patent: Jul. 2, 2019

(54) CAMERA SYSTEM, CAMERA, INTERCHANGEABLE LENS, AND STORAGE MEDIUM STORING CONTROL PROGRAM FOR CAMERA SYSTEM THEREON

(71) Applicant: Olympus Corporation, Hachioji-shi, Tokyo (JP)

(72) Inventor: Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 121 days.

(21) Appl. No.: 15/690,100

(22) Filed: Aug. 29, 2017

(65) Prior Publication Data
US 2018/0063473 A1    Mar. 1, 2018

(30) Foreign Application Priority Data

Aug. 30, 2016   (JP) ................... 2016-168402

(51) Int. Cl.
| | | |
|---|---|---|
| *H04N 5/77* | (2006.01) | |
| *H04N 5/92* | (2006.01) | |
| *G03B 17/14* | (2006.01) | |
| *H04N 5/232* | (2006.01) | |
| *G06F 3/0482* | (2013.01) | |

(52) U.S. Cl.
CPC ........... *H04N 5/9201* (2013.01); *G03B 17/14* (2013.01); *H04N 5/23209* (2013.01); *H04N 5/23212* (2013.01); *H04N 5/23216* (2013.01); *H04N 5/23241* (2013.01); *H04N 5/772* (2013.01); *G03B 2206/00* (2013.01); *G06F 3/0482* (2013.01)

(58) Field of Classification Search
CPC ... G03B 17/14; G03B 2206/00; G06F 3/0482; H04N 5/23209; H04N 5/23212; H04N 5/23216; H04N 5/23241; H04N 5/772; H04N 5/9201
See application file for complete search history.

(56) References Cited

U.S. PATENT DOCUMENTS

| | | | |
|---|---|---|---|
| 10,116,859 B2 * | 10/2018 | Matsunaga | ........ H04N 5/23222 |
| 2008/0170152 A1 * | 7/2008 | Fujii | .................. H04N 5/23209 348/345 |
| 2010/0103284 A1 * | 4/2010 | Sugimori | ........... H04N 5/23209 348/231.3 |

(Continued)

FOREIGN PATENT DOCUMENTS

JP      2004-252139      9/2004

*Primary Examiner* — Amy R Hsu
(74) *Attorney, Agent, or Firm* — John C. Pokotylo; Pokotylo Patent Services

(57) ABSTRACT

A camera system includes a lens-changeable camera body and an interchangeable lens. The camera system includes a usage history information collecting unit configured to collect a plurality of usage history information related to a usage state of the camera system, a usage history information storage unit configured to store the collected usage history information, an information extracting unit configured to extract, from a plurality of the usage history information stored in the usage history information storage unit, usage history information related to the interchangeable lens being attached, and a lens-related information storage unit configured to store the extracted usage history information related to the interchangeable lens.

15 Claims, 17 Drawing Sheets

(56) References Cited

U.S. PATENT DOCUMENTS

| | | | | |
|---|---|---|---|---|
| 2011/0310457 A1* | 12/2011 | Sasaki | ................... | G03B 9/02 |
| | | | | 359/230 |
| 2013/0088580 A1* | 4/2013 | Ikeda | ................... | G02B 7/102 |
| | | | | 348/49 |
| 2013/0242134 A1* | 9/2013 | Komiyama | .......... | H04N 9/8205 |
| | | | | 348/231.5 |
| 2013/0258171 A1* | 10/2013 | Kikuchi | ............. | H04N 5/23212 |
| | | | | 348/353 |
| 2017/0054894 A1* | 2/2017 | Takanashi | .......... | H04N 5/23212 |

\* cited by examiner

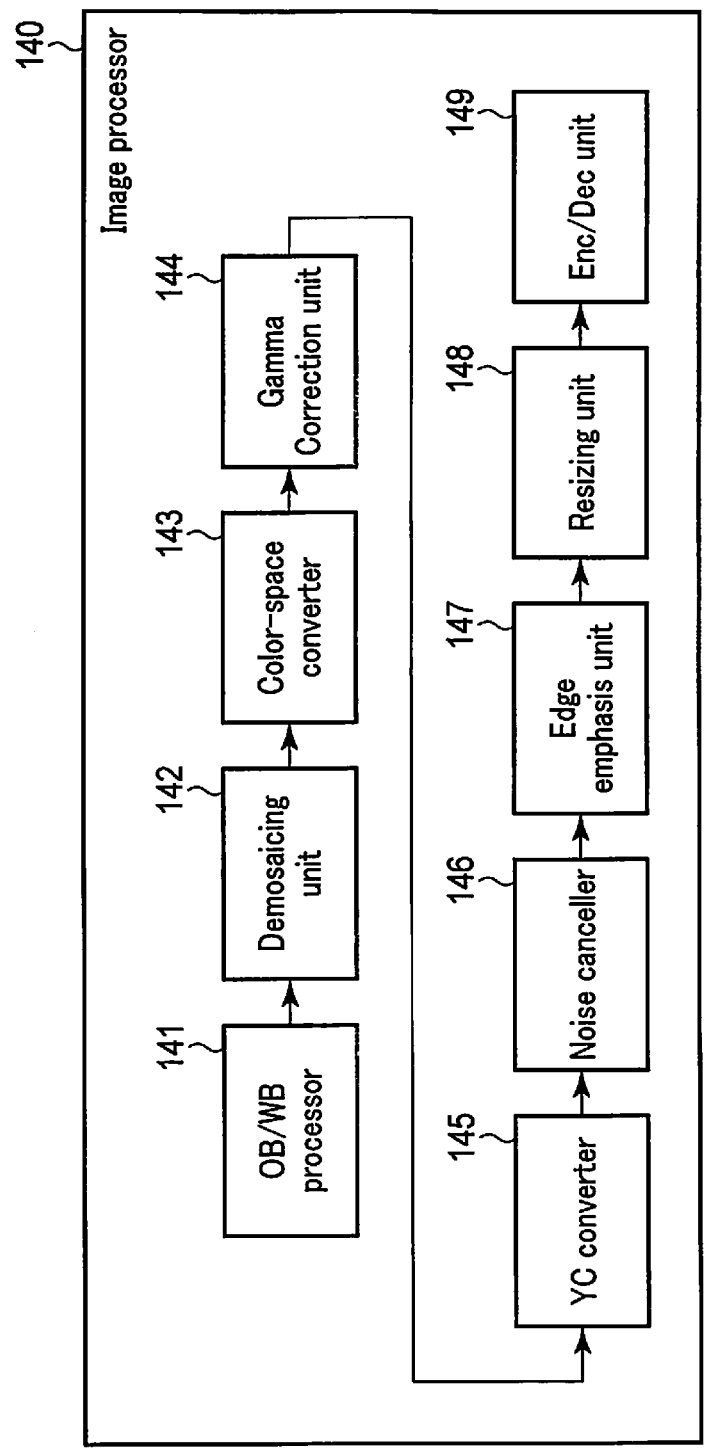
F I G. 6

| Major categories | Minor categories | Data name | Data length(bit) | Value | 0 | 1 | 2 | 3 | 4 | 5 | 6 | 7 |
|---|---|---|---|---|---|---|---|---|---|---|---|---|
| Lens information | Focal distance | LFL1 | 3 | Select from right | ~14mm | ~23mm | ~35mm | ~50mm | ~100mm | ~300mm | ~600mm | ~601mm~ |
| | | LFL2 | 16 | Focal distance(mm) | | | | | | | | |
| | F number | LAV1 | 3 | Select from right | ~F1.0 | ~F1.8 | ~F2.8 | ~F5.6 | ~F8 | ~F16 | ~F22 | F23~ |
| | | LAV2 | 8 | AV value | | | | | | | | |
| | Shutter speed | LSS1 | 3 | Select from right | ~1/4000s | ~1/500s | ~1/125s | ~1/30s | ~1/8s | ~8s | ~60s | 1m~ |
| | | LSS2 | 8 | TV value | | | | | | | | |
| Subject information | Subject type | SBJ1 | 3 | Select from right | People | Forrest & mountains | Flowers | Birds | Insects | Vehicles | Cityscape | Others |
| | | SBJ2 | 12 | Detail classification code | | | | | | | | |
| | Subject distance | DST1 | 3 | Select from right | ~5cm | ~10cm | ~20cm | ~50cm | ~1m | ~5m | ~20m | ~∞ |
| | | DST2 | 8 | Subject distance (power of 2cm) | | | | | | | | |
| Settings | Focus mode | FCM1 | 3 | Select from right | S-AF | C-AF | MF | S-AF+MF | C-AF+TR | | | |
| | Sequential shooting mode | DLV1 | 3 | Select from right | Single shooting | Electronic single shooting | Fast sequential shooting | Electronic fast sequential shooting | Live-view | Electronic LV sequential shooting | Self-timer (2 sec) | Self-timer (12 sec) |
| | IS mode | ISM1 | 2 | Select from right | OFF | Omnidirectional correction | Vertical image stabilizer | Horizontal image stabilizer | | | | |
| | Picture mode | PCT1 | 2 | Select from right | Natural | Vivid | Monochrome | Others | | | | |
| | Art filter mode | ART1 | 3 | Select from right | Pop art | Soft focus | Grainy film | Pin hole | Diorama | Cross process | Dramatic tone | Vintage |
| | Image quality setting | IMM1 | 3 | Select from right | RAW | LargeFine | LargeNormal | MiddleNormal | SmallNormal | LF+RAW | LN+RAW | MN+RAW |
| | Strobe light | STB1 | 2 | Select from right | None | 1 flash | 2 flashes | 3 flashes | | | | |
| Accessories | Power battery holder | PBH1 | 2 | Select from right | None | Used | Used vertical RL | | | | | |
| | Underwater housing | HOU1 | 2 | Select from right | None | Used | Used with STB | | | | | |
| | Monopod/tripod | TRI1 | 2 | Select from right | None | Monopod | Tripod | | | | | |
| Date & place | Date of photographing | DAT1 | 16 | Year/month | | | | | | | | |
| | | DAT2 | 16 | Date/hour minute second | | | | | | | | |
| | Place of photographing | LOG1 | 16 | Latitude/longitude | | | | | | | | |

F I G. 8

| SBJ2 \ SBJ1 | 0 | 1 | 2 | 3 | 4 | 5 | 6 | 7 |
|---|---|---|---|---|---|---|---|---|
| | People | Forrest & mountains | Flowers | Birds | Insects | Vehicles | Cityscape | Others |
| 0~7 | Number of people | Mountainscape, forests, | Type of flowers | Type of birds | Type of insects | Type of vehicles | Type of buildings | Type |
| 8~15 | Age/sex | Type of trees | | | | | | |
| 16~23 | Size & direction of face | | Size and direction of flowers | Size and direction of birds | Size and direction of insects | Size and direction of vehicles | Angle | Size |
| 24~31 | Facial expression | Season and weather | Season and weather | Motion (speed & direction) | Motion (speed & direction) | Motion (speed & direction) | Season and weather | Motion (speed & direction) |

FIG. 9

| Major categories | Minor categories | Data name | Data length(bit) | Value 1 (frequency classification) | Value 2 (frequency) |
|---|---|---|---|---|---|
| Power supply operation | Number of times of turning power ON/OFF | POW1 | 16 | 6(2^6=64 seconds) | Number of times |
| Release operation | Number of times of 1st release | 1RL1 | 16 | 6(2^6=64 seconds) | Number of times |
| Release operation | Number of times of 2nd release | 2RL1 | 16 | 8(2^8=256 seconds) | Number of times |
| Release operation | Number of photographed images | SHT1 | 16 | 6(2^6=64 seconds) | Number of times |
| Playback operation | Number of times of playback display | PRV1 | 16 | 8(2^8=256 seconds) | Number of times |
| Playback operation | Number of times of frame advance | FSL1 | 16 | 8(2^8=256 seconds) | Number of times |
| Menu operation | Number of times of menu display | MEN1 | 16 | 8(2^8=256 seconds) | Number of times |
| Menu operation | Number of times of menu selection | MSL1 | 16 | 8(2^8=256 seconds) | Number of times |
| Lens change | Number of times of lens attachment | LEX1 | 16 | 16(2^16=about 18 hours) | Number of times |

F I G. 10

| Major categories | Minor categories | Data name | Data length(bit) | Value (frequency) |
|---|---|---|---|---|
| Release operation | Number of times of 2nd release | 2RL3 | 16 | Accumulated number of times |
| Lens change | Number of times of lens attachment | LEX3 | 16 | Accumulated number of times |
| Lens information | Focal distance | LFSB31 | 128 | Accumulated number of times of photographing for each subject type (SBJ1) (up to 14 mm) |
| Subject information | Subject type | LFSB32 | 128 | Accumulated number of times of photographing for each subject type (SBJ1) (up to 23mm) |
| | | LFSB33 | 128 | Accumulated number of times of photographing for each subject type (SBJ1) (up to 35 mm) |
| | | LFSB34 | 128 | Accumulated number of times of photographing for each subject type (SBJ1) (up to 50 mm) |
| | | LFSB35 | 128 | Accumulated number of times of photographing for each subject type (SBJ1) (up to 100 mm) |
| | | LFSB36 | 128 | Accumulated number of times of photographing for each subject type (SBJ1) (up to 300 mm) |
| | | LFSB37 | 128 | Accumulated number of times of photographing for each subject type (SBJ1) (up to 600 mm) |
| | | LFSB38 | 128 | Accumulated number of times of photographing for each subject type (SBJ1) (600 mm < focal distance <∞) |

FIG. 11

| Major categories | Minor categories | Data name | Data length (bit) | Value 1 (time) | Value 2 (state) | 0 | 1 | 2 | 3 |
|---|---|---|---|---|---|---|---|---|---|
| Photographing operation | Release | RLT2 | 5 | 0(2^0= 1 second) | Select from right | Release OFF | 1st release | 2nd release | |
| | EVF | EVF2 | 5 | 0(2^0= 1 second) | Select from right | EVF OFF | EVF ON | EVF forced ON | EVF forced OFF |
| Camera operation | Power supply management | BTL2 | 5 | 4(2^4= 16 seconds) | Select from right | ON | Monitor OFF | Sleep | DEEP sleep |

F I G. 12

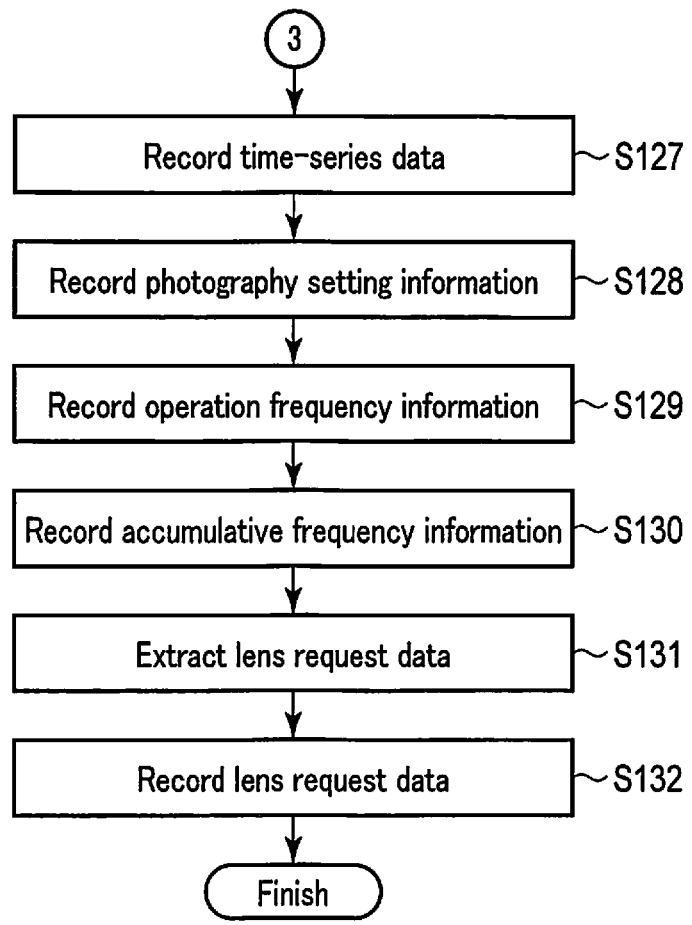
F I G. 13C

| Category | Major categories | Minor categories | Data name |
|---|---|---|---|
| Photography setting | Lens information | Focal distance | LFL1 |
| | | F number | LAV1 |
| | | Shutter speed | LSS1 |
| | Subject information | Subject type | SBJ1 |
| | | Subject distance | DST1 |
| | Settings | Focus mode | FCM1 |
| | | IS mode | ISM1 |
| | Accessories | Strobe | STB1 |
| | | Monopod/tripod | TRI1 |
| | Date & place | Date of photographing | DAT1 |
| Operation frequency | Release operation | Number of times of 2nd release | 2RL1 |
| | Lens change | Number of times of lens attachment | LEX1 |
| Accumulative frequency | Release operation | Number of times of 2nd release | 2RL3 |
| | Lens change | Number of times of lens attachment | LEX3 |
| | Lens information Subject information | Focal distance Subject type | LFSB31 |
| | | | LFSB32 |
| | | | LFSB33 |
| | | | LFSB34 |

F I G. 14

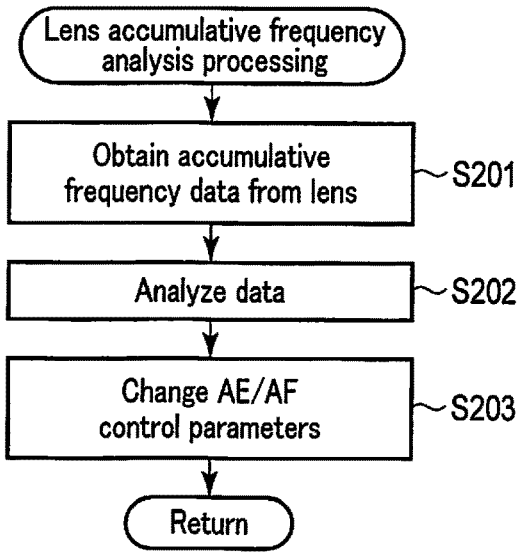
F I G. 15
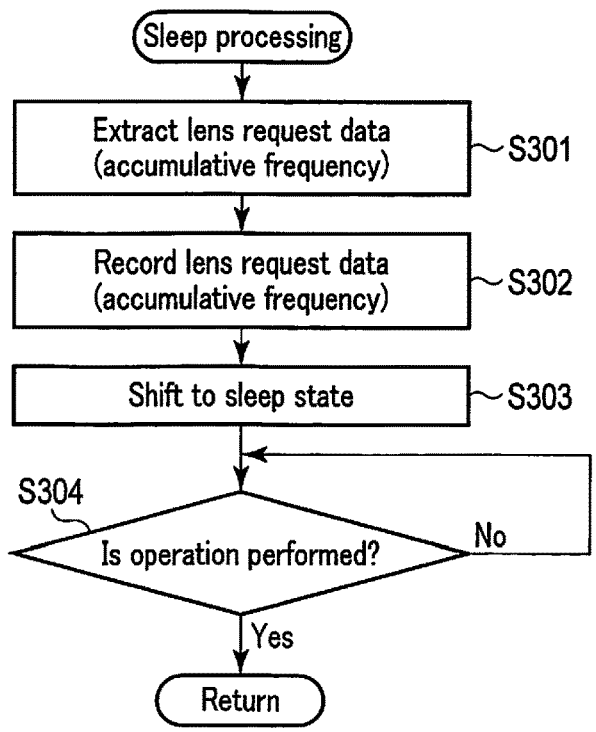
F I G. 16

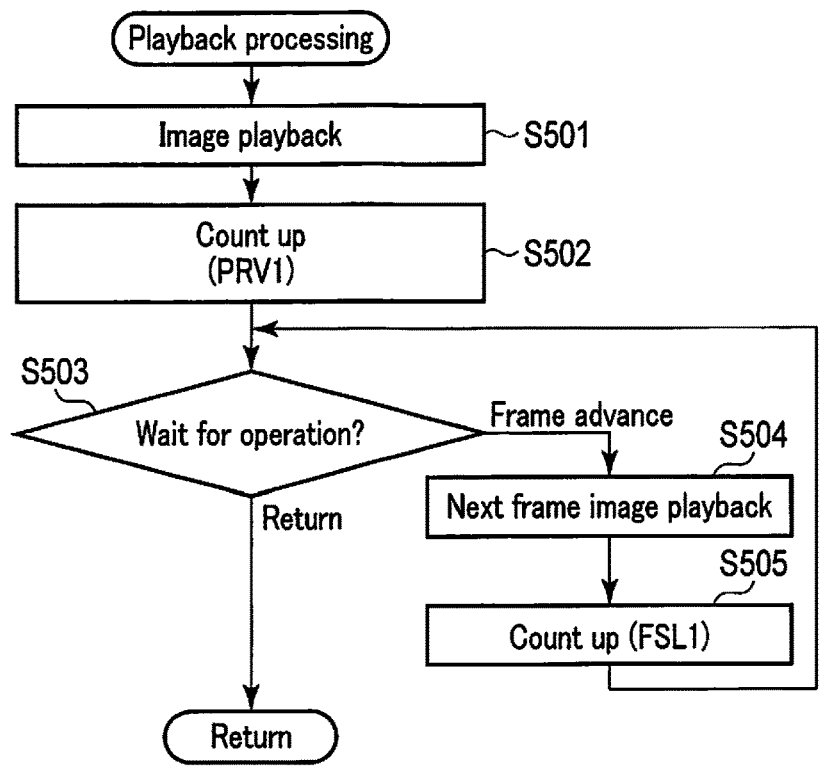
F I G. 18
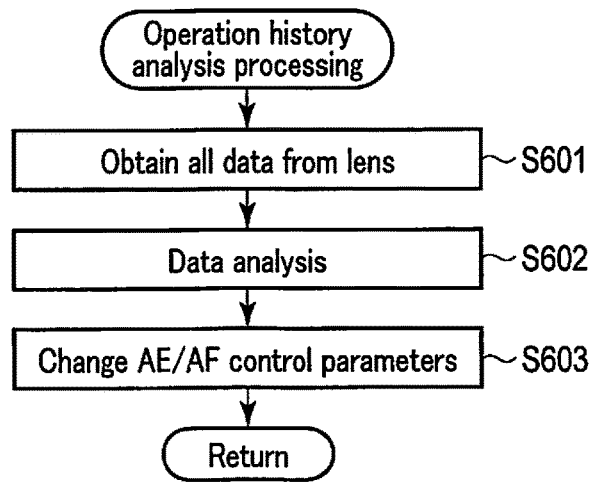
F I G. 19

CAMERA SYSTEM, CAMERA, INTERCHANGEABLE LENS, AND STORAGE MEDIUM STORING CONTROL PROGRAM FOR CAMERA SYSTEM THEREON

CROSS-REFERENCE TO RELATED APPLICATIONS

This application is based upon and claiming the benefit of priority from prior Japanese Patent Application No. 2016-168402, filed Aug. 30, 2016, the entire contents of which are incorporated herein by reference.

BACKGROUND OF THE INVENTION

1. Field of the Invention

The present invention relates to a camera system, a camera, an interchangeable lens, and a storage medium storing a control program for the camera system thereon.

2. Description of the Related Art

A technique of recording a usage state of merchandise as history information to be utilized for user support, etc., is known. In an interchangeable lens camera system, a usage state of cameras and interchangeable lenses that was used in the past can be recorded as history information and can be used when advice as to how to use the camera or lens is given, or when an inspection or purchase of a camera or lens is recommended. For example, history information, such as the number of times of operating a shutter, is usually stored in a memory in a camera main body, and the information is referred to when the camera undergoes an inspection or repair. Jpn. Pat. Appln. KOKAI Publication No. 2004-252139 discloses a technique of recording history information in a nonvolatile memory in an interchangeable lens when an abnormal condition is detected in an operation of the interchangeable lens to use the history information for repair service.

BRIEF SUMMARY OF THE INVENTION

According to an aspect of the invention, a camera system includes a lens-changeable camera body and an interchangeable lens. The camera system includes a usage history information collecting unit configured to collect a plurality of usage history information related to a usage state of the camera system, a usage history information storage unit configured to store the collected usage history information, an information extracting unit configured to extract, from a plurality of the usage history information stored in the usage history information storage unit, usage history information related to the interchangeable lens being attached, and a lens-related information storage unit configured to store the extracted usage history information related to the interchangeable lens.

According to an aspect of the invention, a camera to which an interchangeable lens including a lens-related information storage unit configured to store usage history information related to the interchangeable lens is attached, the camera is included in a camera system and includes a usage history information collecting unit configured to collect a plurality of usage history information related to a usage state of the camera system, a usage history information storage unit configured to store the collected usage history information, and an information extracting unit configured to extract usage history information related to the interchangeable lens from a plurality of the usage history information stored in the usage history information storage unit.

According to an aspect of the invention, an interchangeable lens is included in a camera system. The interchangeable lens is attached to a camera body and includes a usage history information collecting unit configured to collect a plurality of usage history information related to a usage state of the camera system, a usage history information storage unit configured to store the collected usage history information an information extracting unit configured to extract usage history information related to the interchangeable lens from a plurality of the usage history information stored in the usage history information storage unit, and a lens-related information storage unit configured to store the extracted usage history information related to the interchangeable lens.

According to an aspect of the invention, an interchangeable lens is included in a camera system by being attached to a camera body. The camera body includes a usage history information collecting unit configured to collect a plurality of usage history information related to a usage state of a camera system, a usage history information storage unit configured to store the collected usage history information, and an information extracting unit configured to extract usage history information related to an interchangeable lens from a plurality of the usage history information stored in the usage history information storage unit. The interchangeable lens includes a lens-related information storage unit configured to store the extracted usage history information related to the interchangeable lens.

According to an aspect of the invention, a computer-readable non-transitory storage medium stores a control program for controlling a camera system including a camera body to which an interchangeable lens can be attached and the interchangeable lens. The control program causes a computer to execute collecting a plurality of usage history information related to a usage state of the camera system, storing the collected usage history in the information storage unit, extracting, from a plurality of the usage history information stored in the usage history information storage unit, usage history information related to the interchangeable lens being attached, and storing the extracted usage history information related to the interchangeable lens.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6 is a block diagram illustrating an example of the configuration of an image processor according to the embodiment.

FIG. 8 shows an example of photography setting information according to the embodiment.

FIG. 9 shows details of a subject type in an example of the photography setting information according to the embodiment.

FIG. 10 shows an example of operation frequency information according to the embodiment.

FIG. 11 shows an example of accumulative frequency information according to the embodiment.

FIG. 12 shows an example of time-series information according to the embodiment.

FIG. 13C is a flowchart showing an example of camera system control processing according to the embodiment.

FIG. 14 shows an example of lens-related information according to the embodiment.

FIG. 15 is a flowchart showing an example of lens accumulative frequency analysis processing according to the embodiment.

FIG. 16 is a flowchart showing an example of sleep processing according to the embodiment.

FIG. 18 is a flowchart showing an example of playback processing according to the embodiment.

FIG. 19 is a flowchart showing an example of operation history analysis processing according to the embodiment.

DETAILED DESCRIPTION OF THE INVENTION

Figure 1:
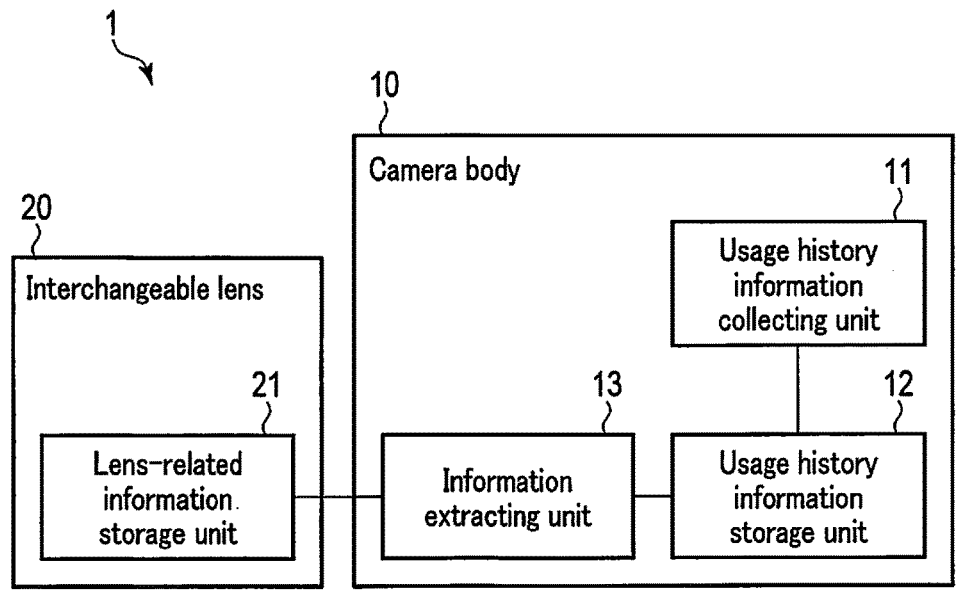
FIG. 1 is a conceptual diagram to explain a concept of a configuration of an interchangeable lens camera system according to an embodiment.

An objective of the present invention is to effectively utilize past usage history information, regardless of a combination of an interchangeable lens and a camera main body. The usage history information is stored or recorded in an interchangeable lens and a camera main body in a format suitable for each of the interchangeable lens and the camera main body. In the present embodiment, writing information to a nonvolatile memory will be mainly called "recording", and writing information to a volatile memory will be mainly called "storing"; however, this terminology is not definitive. Any kind of operations or states may be called recording or storing.

<Configuration of Camera System>

The concept of the configuration of a camera system 1 according to the present embodiment will be explained with reference to the conceptual drawings shown in FIG. 1 and FIG. 2. The details of each component in the camera system 1 will be described later with reference to FIG. 3 to FIG. 6. The camera system 1 includes a camera body 10 as a camera main body and an interchangeable lens 20. The camera body 10 has a usage history information collecting unit 11, a usage history information storage unit 12, and an information extracting unit 13. The interchangeable lens 20 has a lens-related information storage unit 21.

The usage history information collecting unit 11 consecutively collects a usage state of the camera system 1 as usage history information, while the camera system 1 is being activated. Although the details will be described later, the usage history information is, for example, settings of the camera body 10 or the interchangeable lens 20 at the time of photographing, and information of a subject, etc. The usage history information storage unit 12 stores usage history information obtained by the usage history information collecting unit 11. The information extracting unit 13 extracts information related to the interchangeable lens 20 being attached at that time, i.e., lens-related information, from the usage history information stored in the usage history information storage unit 12. The lens-related information includes at least focal distance information and subject type information which are used for photographing. Since focal distance information and subject information are closely related to each other, for example, what kind of subject is photographed with what specific focal distance, the information extracting unit 13 correlates and extracts the focal distance information and subject type information. The lens-related information storage unit 21 stores the lens-related information extracted by the information extracting unit 13. When the interchangeable lens 20 is attached to the camera body 10, the information extracting unit 13 reads items included in the lens-related information stored in the lens-related information storage unit 21, and transfers the items to the camera body 10.

Thus, the camera system 1 according to the present embodiment obtains usage history information and stores it in the camera body 10, and extracts lens-related information from the stored usage history information and stores it in the interchangeable lens 20. The lens-related information stored in the lens-related information storage unit 21 is transferred to the usage history information storage unit 12 in the camera body 10 when the interchangeable lens 20 is attached to the camera body 10. The transferred lens-related information is used to improve the control of the camera system 1, for example. The usage history information and the lens-related information may be accumulated and utilized through a use of information communication technology (ICT), for example, by transferring the information from the camera body 10 or the interchangeable lens 20 to a server via a communication network, such as the Internet.

Furthermore, a case where the interchangeable lens 20 is shared by a plurality of camera bodies will be explained with reference to FIG. 2. First, suppose the interchangeable lens 20 is attached to a first camera body 10A and used. At this time, the usage history information is stored in the usage history information storage unit 12 of the first camera body 10A. The lens-related information extracted from the usage history information is stored in the lens-related information storage unit 21 of the interchangeable lens 20. Afterwards, for example, if the interchangeable lens 20 is attached to a second camera body 10B, the lens-related information stored in the interchangeable lens 20 is transferred to the second camera body 10B and used to improve the operation and control of the camera system 1 consisting of the second camera body 10B and the interchangeable lens 20. In addition, information related to the interchangeable lens 20 is extracted at this time from the usage history information obtained by the second camera body 10B, and the information is also accumulated in the lens-related information storage unit 21. The above case is similar to the case where the interchangeable lens 20 is attached to a third camera body 10C.

Thus, even in a case where one interchangeable lens 20 is shared by a plurality of camera bodies, the usage history information obtained by each of the camera bodies is accumulated in the shared interchangeable lens 20. The accumulated lens-related information is transferred to the other camera bodies when they are attached to be used.

Figure 3:
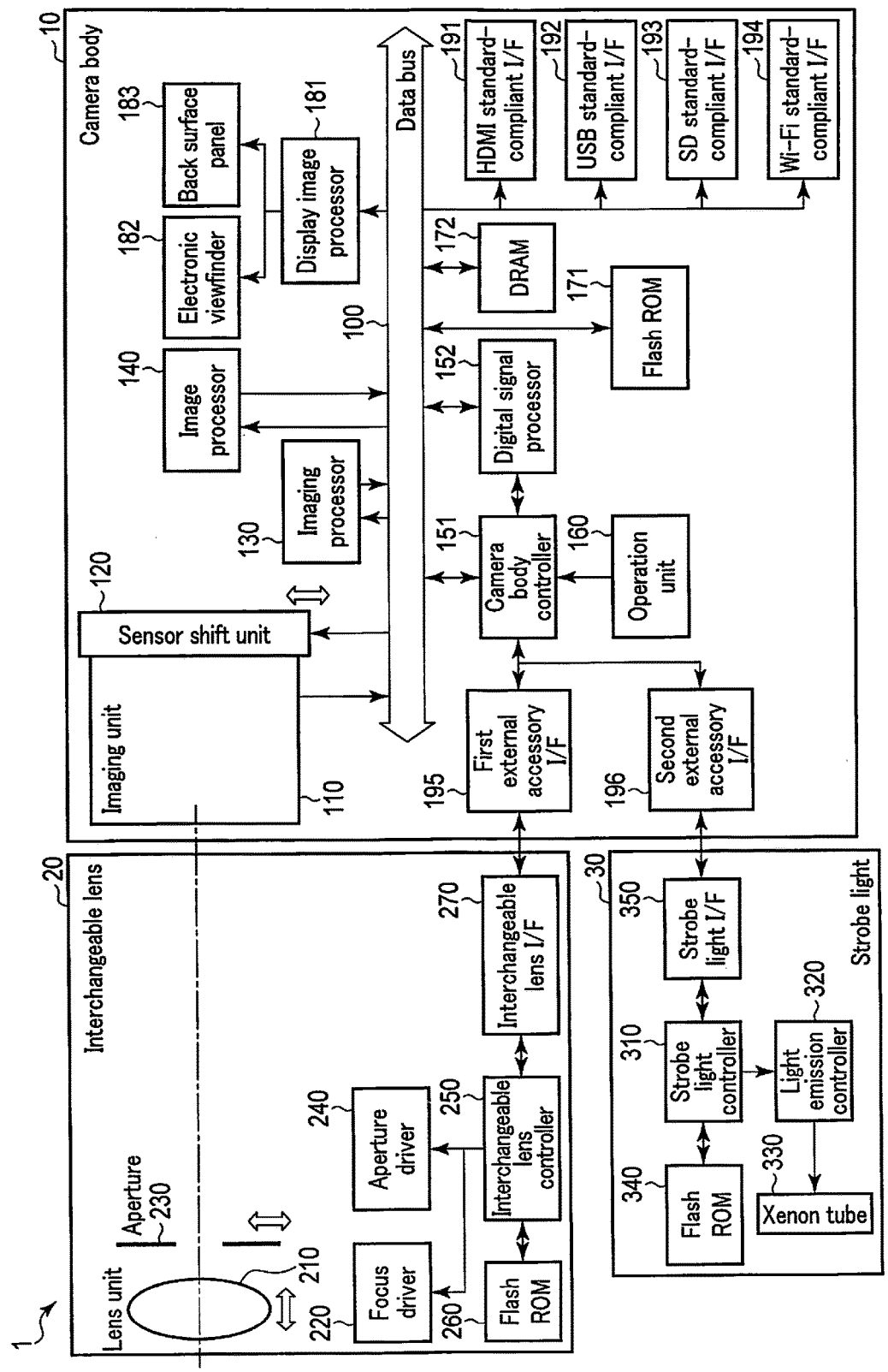
FIG. 3 is a block diagram illustrating an example of the configuration of the interchangeable lens camera system according to the embodiment.

FIG. 3 is a diagram showing an outline of a configuration example of the camera system 1 according to the present embodiment. As shown in FIG. 3, the camera system 1 further includes a strobe light 30. The camera body 10 further includes a data bus 100, an imaging unit 110, a sensor shift unit 120, an imaging processor 130, an image processor 140, a camera body controller 151, a digital signal processor 152, an operation unit 160, a flash ROM 171, a DRAM 172, a display image processor 181, an electronic viewfinder 182, a back surface panel 183, an HDMI standard-compliant I/F (interface) 191, an USB standard-compliant I/F 192, an SD standard-compliant I/F 193, a Wi-Fi standard-compliant I/F 194, a first external accessory I/F 195, and a second external accessory I/F 196. Transmission and reception of various data between the above components is achieved by the data bus 100, etc.

Figure 4:
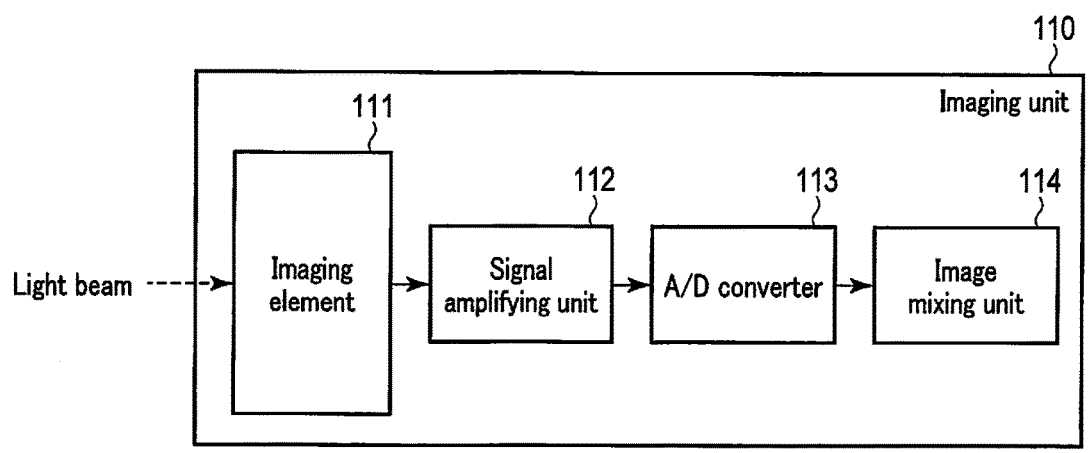
FIG. 4 is a block diagram illustrating an example of the configuration of an imaging unit according to the embodiment.

A configuration example of the imaging unit 110 according to the present embodiment is explained with reference to FIG. 4. The imaging unit 110 has an imaging element 111, a signal amplifying unit 112, an A/D converter 113, and a pixel mixing unit 114.

The imaging element 111 converts a subject image formed on an imaging surface by incident light beam into an electric signal by photoelectric conversion in each pixel, i.e., an imaging signal. The signal amplifying unit 112 amplifies the imaging signal. In the present embodiment, an input to the signal amplifying unit 112 is an analog signal; however, a digital signal as an input may be amplified. The A/D converter 113 converts an analog imaging signal amplified by the signal amplifying unit 112 into a digital imaging signal. The digital imaging signal may be called imaging data or image data. The pixel mixing unit 114 performs pixel mixing on the image data. After performing the above-described processing, the imaging unit 110 outputs the image data to the DRAM 172, which is a later-described buffer memory for temporary storage, via the data bus 100.

The explanation continues, with reference back to FIG. 3. The sensor shift unit 120 is an image stabilizer mechanism. The sensor shift unit 120 adjusts a relative position relationship between the imaging surface of the imaging element 111 and the image-formation surface of a subject with respect to a direction perpendicular to an optical axis or a light beam by moving the imaging unit 110 based on a control signal that is output from a later-described camera body controller 151.

Figure 5:
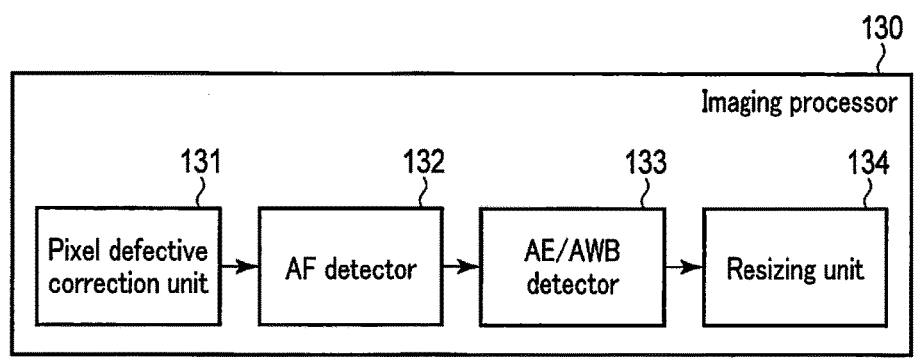
FIG. 5 is a block diagram illustrating an example of the configuration of an imaging processor according to the embodiment.

A configuration example of the imaging processor 130 according to the present embodiment is explained with reference to FIG. 5. The imaging processor 130 has a pixel defect correction unit 131, an AF detector 132, an AE/AWB detector 133, and a resizing unit 134, as shown in FIG. 5.

The pixel defect correction unit 131 performs correction for pixel defects, such as stuck pixels and dead pixels, etc., on the image data obtained and processed by the imaging unit 110. The AF detector 132 obtains an AF evaluation value based on the image data, and outputs the value. The AE/AWB detector 133 obtains an exposure value and an AWB value based on the image data, and evaluates and outputs the values. The resizing unit 134 performs resizing processing on the image data for recording or displaying.

A configuration example of the image processor 140 according to the present embodiment is explained with reference to FIG. 6. The image processor 140 has an OB/WB processor 141, a demosaicing unit 142, a color-space converter 143, a gamma correction unit 144, a YC converter 145, a noise canceler 146, an edge emphasis unit 147, a resizing unit 148, and an Enc/Dec unit 149, as shown in FIG. 6.

The OB/WB processor 141 performs black color correction based on a dark current component on image data obtained via the data bus 100, and performs white balance adjustment based on an AWB value. The white balance adjustment may be performed in the AE/AWB detector 133. The demosaicing unit 142 performs demosaicing processing on the image data to interpolate each of an R value, a G value, and a B value in each pixel of the image data. The color-space converter 143 performs color-space conversion, saturation correction, and hue correction processing using a Color Matrix (CMX) on the image data. The gamma correction unit 144 performs gradation correction processing on the image data. The YC converter 145 converts the RGB image data into brightness and color difference (YC) image data. With respect to the processing, such as the above-described saturation and hue correction processing, and gradation correction processing, etc., after the data image is converted into YC signals, gradation correction processing may be performed for Y signals, and saturation and hue correction processing may be performed for C signals (Cb, Cr), for example. The noise canceler 146 performs noise canceling processing on the image data on which the above-described various processing were performed. The edge emphasis unit 147 performs edge emphasis processing. The resizing unit 148 performs resizing processing for recording and displaying on image data, and the Enc/Dec unit 149 encodes image data for recording and decodes image data which is encoded for playback. The image processor 140 performs the above-described processing on the image data, and then outputs the data to the data bus 100.

The explanation continues, with reference back to FIG. 3. The camera body controller 151 is an integrated circuit, for example a central processing unit (CPU), etc. The camera body controller 151 controls an operation of each component of the camera body 10, such as the imaging unit 110, the sensor shift unit 120, the imaging processor 130, the image processor 140, a later-described digital signal processor 152, etc. The camera body controller 151 further controls an input and output of image data and various data including information related to the camera system 1, etc. The camera body controller 151 obtains an operation signal from a later-described operation unit 160, and controls the operation of each unit based on the signal.

The camera body controller 151 obtains usage history information, which is described above with reference to FIG. 1, and extracts lens-related information from the obtained usage history information. In other words, the camera body controller 151 is included in the usage history information collecting unit 11 and the information extracting unit 13. The camera body controller 151 records, stores, and reads, etc. various data from and to the later-described flash ROM 171 and DRAM 172.

The digital signal processor 152 is an integrated circuit, for example a digital signal processor (DSP), etc. The digital signal processor 152 performs processing on digitized data, for example A/D-converted image data. The digital signal processor 152 may, for example, perform processing that places a high load on the imaging processor 130 and the image processor 140.

In the present embodiment, as described above with reference to FIG. 1, each of the usage history information and the lens-related information is collected and stored in the usage history information storage unit 12, or the lens-related information storage unit 21. The above information is, for example conditions during photographing and information about a subject, etc., as will be described later in detail. The information is closely related to each other, and is essential when effectively utilizing usage history information for improving the control of the interchangeable lens camera system, and so on. In the present embodiment, the camera system 1 performs information processing by, for example, constructing a neural network in the digital signal processor 152, to specify subject information. A reference destination of information in the neural network may be on the Internet, or on a server at a registered address. Thus, the digital signal processor 152 is also used to obtain usage history information. In other words, the digital signal processor 152 is included in the usage history information collecting unit 11.

The operation unit 160 obtains a result of user's operation as an input, and outputs the obtained result to the camera body controller 151 as an operation signal. The operation unit 160 is, for example, a press button, such as a release button, etc., a knob, a dial, a slider, a touch panel, etc. but is not limited thereto.

The flash ROM 171 is a nonvolatile memory for storing various data in the camera body 10. In the flash ROM 171, for example, image data obtained by photographing, information at the time of obtaining the image data, and various setting information related to the operation of the camera system 1 and the like, are recorded. The DRAM 172 is a buffer memory for temporary storage of various data. The DRAM 172 is used as a working area, etc. for converting image data. In the flash ROM 171 and the DRAM 172, the usage history information obtained by the usage history information collecting unit 11, as described above with reference to FIG. 1 and FIG. 2, is recorded or stored. In other words, the flash ROM 171 and the DRAM 172 are included in the usage history information storage unit 12.

The display image processor 181 obtains, via the data bus 100, image data on which various image processing is performed, and performs processing required for displaying the image data, for example converting a data format, and so on. The display image processor 181 outputs the image data to the electronic viewfinder 182 and the back surface panel 183. The electronic viewfinder 182 and the back surface panel 183 display the image data based on the output from the display image processor 181 that is respectively obtained by the electronic viewfinder 182 and the back surface panel 183.

Each of the HDMI standard-compliant I/F 191, the USB standard-compliant I/F 192, the SD standard-compliant I/F 193, and the Wi-Fi standard-compliant I/F 194 has, for example, an output circuit and an output terminal compliant to each of the standards, and outputs in compliance with each of the standards. For example, image data obtained by photographing, and information at the time of obtaining the image data may be recorded in, and read from an external recording medium connected via each type of interface, such as an SD card connected to the SD standard-compliant I/F 193.

The first external accessory I/F 195 is a connecting portion to be connected to external devices, such as camera accessories, etc. In the present embodiment, the first external accessory I/F 195 is used when the interchangeable lens 20 is attached to the camera body 10.

The second external accessory I/F 196 is a connecting portion to be connected to an external device, such as a camera accessory, etc. In the present embodiment, the second external accessory I/F 196 is used when the strobe light 30 is attached to the camera body 10.

The interchangeable lens 20 has a lens unit 210, a focus driver 220, an aperture unit 230, an aperture driver 240, an interchangeable lens controller 250, a flash ROM 260, and an interchangeable lens I/F 270.

The lens unit 210 consists of a plurality of lenses, etc. An image of a subject entered to the group of lenses that constitute the lens unit 210 is formed on an imaging surface of the imaging element 111. The focus driver 220 adjusts the focus of the lens unit 210 by driving the focus lens included in the lens unit 210 in a direction as indicated by an alternate long and short dashed line in FIG. 3, in other words, an optical axis direction of the lens unit 210.

The aperture unit 230 consists of an aperture diaphragm, etc. The aperture unit 230 adjusts an amount of light in a luminous flux incident from the subject to the imaging element 111 via the lens unit 210. The drive of the aperture driver 240 operates the aperture unit 230.

The interchangeable lens controller 250 is an integrated circuit, etc., such as a CPU, etc. The interchangeable lens controller 250 controls each unit in the interchangeable lens 20, such as the above-described focus driver 220 and aperture driver 240. The interchangeable lens controller 250 may obtain lens-related information extracted by the information extracting unit 13 and stores it in the lens-related information storage unit 21. In other words, the interchangeable lens controller 250 may be included in the information extracting unit 13.

The flash ROM 260 is a non-volatile memory of the interchangeable lens 20. In the flash ROM 260, various setting information, etc. related to the operation of the interchangeable lens 20 is recorded, for example. As described above with reference to FIG. 1 and FIG. 2, the lens-related information extracted by the information extracting unit 13 is also recorded in the flash ROM 260. In other words, the flash ROM 260 is included in the lens-related information storage unit 21.

The interchangeable lens I/F 270 is connected to the first external accessory I/F 195 of the camera body 10 to allow communications between the camera body 10 and the interchangeable lens 20. The data communication including a control signal and the aforementioned lens-related information, etc. between the camera body 10 and the interchangeable lens 20 is performed via the interchangeable lens I/F 270.

The strobe light 30 has a strobe light controller 310, a light emission controller 320, a xenon tube 330, a flash ROM 340, and a strobe light I/F 350. The strobe light 30 operates when an amount of light is insufficient at the time of exposure. The strobe light controller 310 is an integrated circuit, such as a CPU, etc. The strobe light controller 310 communicates with the camera body controller 151 and the interchangeable lens controller 250, etc. via the strobe light I/F 350, and outputs a control signal to the light emission controller 320 when an instruction to emit light is received from the camera body controller 151. The light emission controller 320 causes the xenon tube 330 to emit a light based on the control signal.

Each of the components in the usage history information collecting unit 11 and the information extracting unit 13, i.e., the camera body controller 151, the interchangeable lens controller 250, and the strobe light controller 310, is a central processing unit (CPU); however, it may be an integrated circuit of other types, such as an application specific integrated circuit (ASIC), a field programmable gate array (FPGA), a graphics processing unit (GPU), or a digital signal processor (DSP), etc.

Each of the components in the usage history information collecting unit 11 and the information extracting unit 13, i.e., the camera body controller 151, the interchangeable lens controller 250, and the strobe light controller 310, may be constituted by a single integrated circuit or by a combination of a number of integrated circuits. Two or more circuits of the above-described circuits may be configured of one integrated circuit. The operations of these integrated circuits are executed, for example, in accordance with programs recording the flash ROM 171, the flash ROM 260, the flash ROM 340, or an integrated circuit, etc. on a recording region which is provided therein.

A processing circuit of, for example, the digital signal processor 152, the imaging unit 110, the imaging processor 130, image processor 140, and the display image processor 181, etc. may be constituted by a single integrated circuit or by a combination of a number of integrated circuits. Two or more components of the above-described components may be configured of one integrated circuit. Furthermore, each of the above-listed components is provided as hardware; however, it may be provided as software, or a combination of hardware and software.

<Collected Data of Camera System>

Figure 7:
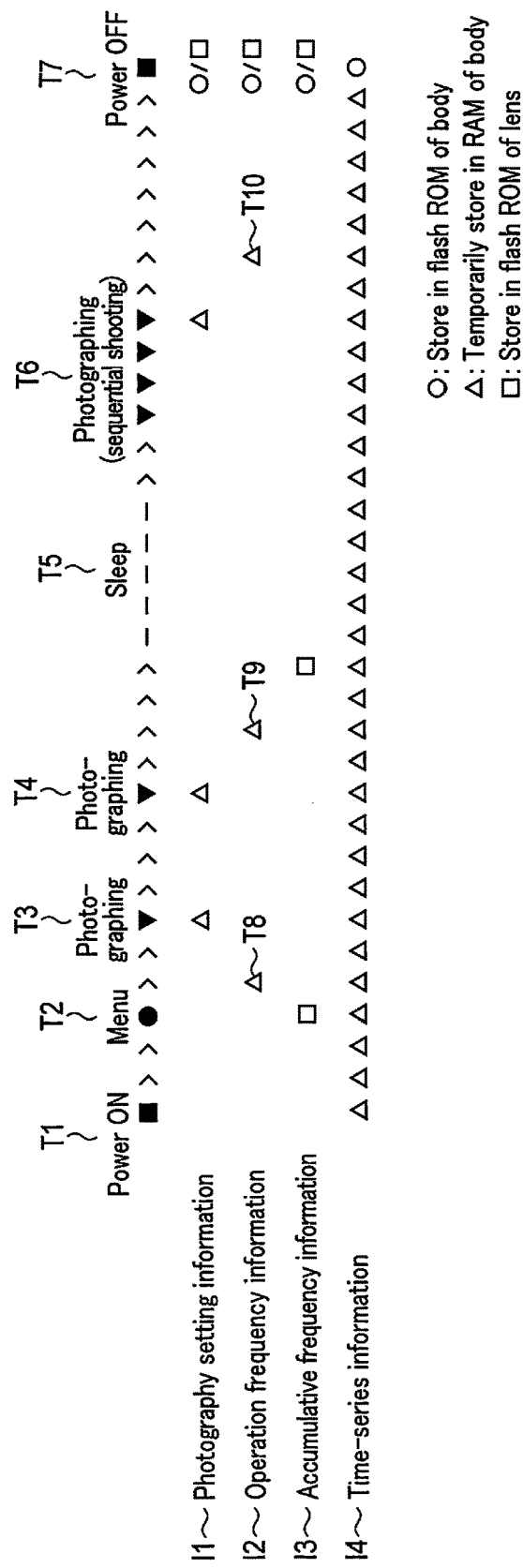
FIG. 7 is a timing chart illustrating an example of data record timing according to the embodiment.

Herein, timing of obtaining various information by the usage history information collecting unit 11 in the present embodiment will be explained with reference to the timing chart shown in FIG. 7. As shown in FIG. 7, the usage history information collected by the usage history information collecting unit 11 includes photography setting information I1, operation frequency information I2, accumulative frequency information I3, and time-series information I4. Hereinafter, the data respectively included in the photography setting information I1, the operation frequency information I2, the accumulative frequency information I3, and the time-series information I4 will be respectively referred to as photography setting data, operation frequency data, accumulative frequency data, and time-series data.

The photography setting information I1 is information indicating photography setting when photographing is performed, and the information is obtained by the usage history information collecting unit 11 after the photographing, such as timing T3 and timing T4, and temporarily stored in the usage history information storage unit 12. The usage history information storage unit 12 herein is, for example, a DRAM 172 of the camera body 10. In a case of sequential shooting, the photography setting information I1 is obtained after the sequential shooting is finished, as in timing T6. The photography setting information I1 is recorded in a flash ROM 171 of the usage history information storage unit 12 when the power is turned off, as in timing T7. The lens-related information is extracted from the photography setting information I1 by the information extracting unit 13, and is recorded in the lens-related information storage unit 21. The lens-related information storage unit 21 herein is, for example, a flash ROM 260.

Herein, each of the items included in the photography setting information I1 is explained with reference to FIG. 8. The photography setting information I1 has items of lens information, subject information, settings, accessories, and date & place, as major categories. The item of the lens information has items of focal distance, F number, and shutter speed, as minor categories. The item of the subject information has items of subject type and subject distance, as minor categories. The item of the setting information has items of focus mode, sequential shooting mode, IS mode, picture mode, art filter mode, and image quality setting, as minor categories. The item of the accessories information has items of strobe light, power battery holder, underwater housing, and monopod/tripod, as minor categories. The item of the date & place information has items of date of photographing and place of photographing, as minor categories.

The data in the item of focal distance is data indicating a focal distance of the lens unit 210 when photographing is performed, and is stored under the data name LFL. LFL includes LFL1 and LFL2, and the data capacity of LFL1 is kept low. LFL1 has 3 bits as a data length. The value 0 if the focal distance is equal to or shorter than 14 mm, the value 1 if equal to or shorter than 23 mm, the value 2 if equal to or shorter than 35 mm, the value 3 if equal to or shorter than 50 mm, the value 4 if equal to or shorter than 100 mm, the value 5 if equal to or shorter than 300 mm, the value 6 if equal to or shorter than 600 mm, and the value 7 if longer than 600 mm, is stored as LFL1. However, LFL2 has 16 bits as a data length, and an actually-measured focal distance is stored in the unit of millimeter.

The data in the item of F number is data indicating an F number of the aperture unit 230 when photographing is performed, and is stored under the data name LAV. LAV includes LAV1 and LAV2, and the data capacity of LAV1 is kept low. LAV1 has 3 bits as a data length. The value 0 if the F number is equal to or smaller than 1.0, the value 1 if equal to or smaller than 1.8, the value 2 if equal to or smaller than 2.8, the value 3 if equal to or smaller than 5.6, the value 4 if equal to or smaller than 8, the value 5 if equal to or smaller than 16, the value 6 if equal to or smaller than 22, and the value 7 if larger than 22, is stored as LAV1. LAV2 has 8 bits as a data length, and an AV value corresponding to an F number which is stored as LAV1 is stored as an actual measured value.

The data in the item of shutter speed is data indicating shutter speed when photographing is performed, and stored as the data name LSS. LSS includes LSS1 and LSS2, and the data capacity of LSS1 is kept low. LSS1 has 3 bits as a data length. The value 0 if the shutter speed is equal to or faster than 1/4000 second, the value 1 if equal to or faster than 1/500 second, the value 2 if equal to or faster than 1/125 second, the value 3 if equal to or faster than 1/30 second, the value 4 if equal to or faster than 1/8 second, the value 5 if equal to or faster than 8 seconds, the value 6 if equal to or faster than 60 seconds, and the value 7 if slower than 60 seconds, is stored as LSS1. LSS2 has 8 bits as a data length, and a TV value corresponding to a shutter speed stored as LSS1 is stored as an actual measured value.

The data in the item of subject type is data indicating a subject type when photographing is performed, and is stored under the data name SBJ. SBJ includes SBJ1 and SBJ2, and the data capacity of SBJ1 is kept low. SBJ1 has 3 bits as a data length. The value 0 if the subject is people, the value 1 if the subject is natural landscape, such as forests and mountains, the value 2 if the subject is flowers, the value 3 if the subject is birds, the value 4 if the subject is insects, the value 5 if the subject is vehicles, the value 6 if the subject is cityscape, and the value 7 if the subject is other than these examples, is stored as SBJ1. SBJ2 has 12 bits as a data length, and a value is stored in accordance with a later-described detailed classification code for each subject type.

Herein, the detailed classification code of a subject type will be explained with reference to FIG. 9. SBJ2 is information for specifying and recording each subject included in SBJ1 in more details.

If the value of SBJ1 is 0, in other words, the subject type is people, the items stored as SBJ2 are the number of people, age & sex, size and direction of face, and facial expression. If the value of SBJ1 is 1, in other words, the subject type is forests and mountains, the items stored as SBJ2 are a type of scene, i.e., mountainscape, forest, open-air, a type of tree, and season & weather. If the value of SBJ1 is 2, in other words, the subject type is flowers, the items stored as SBJ2 are a type of flowers, size & direction of flowers, and season & weather. If the value of SBJ1 is 3, in other words, the subject type is birds, the item stored as the SBJ2 is a type of birds, size & direction of birds, and motion (speed & direction). If the value of SBJ1 is 4, in other words, the subject type is insects, the items stored as SBJ2 are a type of insects, size & direction of insects, and motion (speed & direction). If the value of SBJ1 is 5, in other words, the subject type is vehicles, the items stored as SBJ2 are a type of vehicles, size & direction of vehicles, and motion (speed & direction). If the value of SBJ1 is 6, in other words, the subject type is cityscape, the items stored as the SBJ2 are a type of buildings, angle, and season & weather. If the value of SBJ1 is 7, in other words, the subject type is other than the above-described types, the items stored as the SBJ2 are a type, size, and motion (speed & direction).

Each 3 bits of the 12-bit data of SBJ2 is allocated to each item in SBJ2, like the one described above. Accordingly, eight different patterns of data can be stored in each item of SBJ2. It should be noted, however, 6 bits are allocated to each of the items of a type of tree, a type of flower, a type of bird, a type of insect, a type of vehicle, a type of building, and a type of other than those. Accordingly, 64 different patterns of data can be stored in each of these items. A subject type, that is, what is photographed using the interchangeable lens 20, is one of the most important pieces of information among the usage history information related to the interchangeable lens 20.

The explanation regarding the items included in the photography setting information I1 continues, with reference back to FIG. 8. The data in the item of subject distance is data indicating a distance to a subject when photographing is performed, and is stored under the data name DST. DST includes DST1 and DST2, and the data capacity of DST1 is kept low. DST1 3 bits as a data length. The value 0 if the subject distance is equal to or shorter than 5 cm, the value 1 if equal to or shorter than 10 cm, the value 2 if equal to or shorter than 20 cm, the value 3 if equal to or shorter than 50 cm, the value 4 if equal to or shorter than 1 m, the value 5 if equal to or shorter than 5 m, the value 6 if equal to or shorter than 20 m, and the value 7 if longer than 20 m, is stored as DST1. DST2 has 8 bits as a data length, and a power index when the subject distance of DST1 is expressed as a power of 2 cm is stored as DST2.

The data in the item of focus mode is data indicating the focus mode setting when photographing is performed, and is stored under the data name FCM1. FCM1 has 3 bits as a data length. The value 0 if the focus mode setting is a single auto focus (S-AF), the value 1 if the focus mode setting is a continuous auto focus (C-AF), the value 2 if the focus mode setting is a manual focus (MF), the value 3 if the focus mode setting is a combination of S-AF and MF, and the value 4 if the focus mode setting is a combination of C-AF and tracking (TR), is stored as FCM1.

The data in the item of sequential shooting mode is data indicating the sequential shooting mode setting when photographing is performed, and is stored under the data name DLV1. DLV1 has 3 bits as a data length. The value 0 if the sequential shooting mode is a single shooting, the value 1 if the sequential shooting mode is an electronic single shooting, the value 2 if the sequential shooting mode is fast sequential shooting, the value 3 if the sequential shooting mode is electronic fast sequential shooting, the value 4 if the sequential shooting mode is live-view (LV) sequential shooting, the value 5 if the sequential shooting mode is electronic LV sequential shooting, the value 6 if a self-timer is set for 2 seconds, and the value 7 if a self-timer is set for 12 seconds, is stored as DLV1.

The data in the item of IS mode is data indicating the image stabilizer (IS) mode when photographing is performed, and is stored under the data name ISM1. ISM1 has 2 bits as a data length. The value 0 of the IS mode setting is off, the value 1 if omnidirectional correction is applied, the value 2 if vertical-direction image stabilizer is applied, and the value 3 if horizontal-direction image stabilizer is applied, is stored as a value of ISM1.

The data in the item of picture mode is data indicating the picture mode setting when photographing is performed, and is stored under the data name PCT1. PCT1 has 2 bits as a data length. The value 0 if the picture mode is set to "natural", the value 1 if the picture mode is set to "vivid", the value if the picture mode is "monochrome", the value 3 if the picture mode is set to a mode other than these modes, is stored as PCT1.

The data in the item of art filter mode is data indicating the art filter mode setting when photographing is performed, and is stored under the data name ART1. ART1 has 3 bits as a data length. The value 0 if the art filter mode is set to "Pop Art", the value 1 if the art filter mode is set to "Soft Focus", the value 2 if the art filter mode is set to "Grainy Film", the value 3 if the art filter mode is set to "Pin Hole", the value 4 if the art filter mode is set to "Diorama", the value 5 if the art filter mode is set to "Cross Process", the value 6 if the art filter mode is set to "Dramatic Tone", and the value 7 if the art filter mode is set to "Vintage", is stored as ART1.

The data in the item of image quality setting is data indicating the image quality setting when photographing is performed, and is stored under the data name IMM1. IMM1 has 3 bits as a data length. The value 0 if the image quality is set to RAW, the value 1 if the image quality is set to Large Fine (LF), the value 2 if the image quality is set to Large Normal (LN), the value 3 if the image quality is set to Middle Normal (MN), the value 4 if the image quality is set to Small Normal, the value 5 if the image quality is set to LF+RAW, the value 6 if the image quality is set to LN+RAW, and the value 7 if the image quality is set to MN+RAW, is stored as IMM1.

The data in the item of strobe light is data indicating the presence/absence of an external strobe light when photographing is performed, and is stored under the data name STB1. STB1 has 2 bits as a data length. The value 0 if there is no external strobe light, the value 1 if there is one external strobe light, the value 2 if there are two external strobe lights, and the value 3 if there are three or more strobe lights, is stored as STB1. The external strobe light herein is not limited to one attached to the camera body 10; it may be a wireless strobe light that can be remotely controlled by the camera system 1.

The data in the item of power battery holder is data indicating the presence/absence of a power battery holder when photographing is performed, and is stored under the data name PBH1. PBH1 has 2 bits as a data length. The value 0 if no power battery holder is attached, the value 1 if a normal power battery holder is attached, and the value 2 if a power batter holder having a release button for vertical-position photographing is attached, is stored as PBH1.

The data in the item of underwater housing is data indicating presence/absence of the underwater housing when photographing is performed, and is stored under the data name HOU1. HOU1 has 2 bits as a data length. The value 0 if no underwater housing is attached, the value 1 if a normal underwater housing is attached, and the value 2 if an underwater housing having a strobe is attached, is stored as HOU1.

The data in the item of monopod/tripod is data indicating presence/absence of the monopod/tripod when photographing is performed, and is stored under the data name TRI1. TRI1 has 2 bits as a data length. The value 0 if no monopod and tripod is attached, the value 1 if a monopod is attached, and the value 2 if a tripod is attached, is stored as TRI1.

The data in the item of date and time of photographing is data indicating the date and time when photographing is performed, and is stored under the data name DAT. DAT includes DAT1 and DAT2. DAT1 has 16 bits as a data length. As DAT1, information of year and month in date & time of photographing is stored as actual measured values. DAT2 has 16 bits as a data length. As DAT2, information of date, hour, minute, and second in the date & time of photographing is stored as actual measured values. The data in the item of place of photographing is stored under the data name LOC1. LOC1 is data indicating a place of photographing when photographing is performed, and has a data length of 16 bits. As LOC1, information of a latitude and a longitude as a place of photographing is stored as an actual measured value.

The explanation regarding data recording timing continues, with reference back to FIG. 7. The operation frequency information I2 is frequency of operation related to each item within a predetermined length of time, which is obtained at a predetermined interval of time. Although the items included in the operation frequency information I2 will be described later, at timing T8 for example, the items related to power supply operation and the items related to the menu operation are updated by the usage history information collecting unit 11, and at timing T9 and T10 after a predetermined length of time is elapsed, the items related to photographing are updated. The operation frequency information I2 obtained in such a manner is stored in the DRAM 172 of the camera body 10, for example. When the power is turned off, like at timing T7, the operation frequency information I2 is recorded in the flash ROM 171, similar to the case of the photography setting information I1. The lens-related information in the operation frequency information I2 is extracted by the information extracting unit 13, and is recorded in the flash ROM 260.

Herein, each of the items included in the operation frequency information I2 is explained with reference to FIG. 10. The operation frequency information I2 includes items of power supply operation, release operation, playback operation, menu operation, and lens change, as major categories. The item of power supply operation has an item of the number of times of turning the power on/off as a minor category. The item of release operation has items of the number of times of performing 1st release, the number of times of performing 2nd release, and the number of photographed images, as minor categories. The item of playback operation has items of the number of times of playback display and the number of times of frame advance, as minor categories. The item of menu operation has items of the number of times of menu display and the number of times of menu selection, as minor categories. The item of lens change has an item of the number of times of lens attachment, as a minor category.

The data in each item included in the operation frequency information I2 has 16 bits as a data length, and stores Value 1 and Value 2. In Value 1, a frequency range, in other words, a time width of a predetermined length of time, is stored as an exponential index when the time width is expressed in exponentiation of 2 in the unit of seconds. In Value 2, the frequency in the frequency range indicated by Value 1, in other words, the number of times, is stored as a real number. For example, if Value 1 is 6 and Value 2 is 3 in an item, the values indicate the frequency of the item is three times in the 6th power of 2, i.e., 64 seconds. Value 1 for each item is set and stored in advance. The operation frequency information I2 is updated at a predetermined interval; however, the history before the updating may be stored, and an average of each item may be stored.

The data in the item of the number of times of turning of the power on/off is data indicating the number of times of turning the power of the camera system 1 on/off, and is stored under the data name POW. The value 6 is stored as Value 1 of POW 1. For the item of the number of times of turning the power on/off, data may be stored separately for the number of times of turning the power on and for the number of times of turning the power off.

The data in the item of the number of times of performing 1st release is data indicating the number of times of performing the 1st release operation when photographing is performed, and is stored under the data name 1RL1. The data in the item of the number of times of performing 2nd release is data indicating the number of times of performing the 2nd release operation when photographing is performed, and is stored under the data name 2RL1. The data in the item of the number of photographed images is data indicating the number of photographed images when photographing is performed, and is stored under the data name SHT1. The value 6 is stored as Value 1 of 1RL1 and SHT1, and the value 8 is stored as Value 1 of 2RL1.

The data in the item of the number of times of playback display is data indicating the number of times of performing a playback operation for image data, and is stored under the data name PRV1. The data in the item of the number of times of frame advance is data indicating the number of times performing a frame advance operation for image data, and is stored under the data name FSL1. The value 8 is stored as Value 1 of PRV1 and FSL1.

The data in the item of the number of times of menu display is data indicating the number of times of displaying a menu, and is stored under the data name MEN1.

The data in the item of the number of times of menu selection is data indicating the number of times of selection made during menu display, and is stored under the data name MSL1. The value 8 is stored as Value 1 of MEN1 and MSL1. For the item of the number of times of menu selection, data may be stored for each content of selected menu.

The data in the item of the number of times of lens attachment is data indicating the number of times of attaching a lens to the camera body 10, and is stored under the data name LEX1. The value 16 is stored in Value 1 of LEX1.

The explanation regarding data recording timing continues, with reference back to FIG. 7. In the accumulative frequency information I3, frequency information of each item therein is stored as an accumulative number of times with respect to how the camera system 1 is used. Although the items included in the accumulative frequency information I3 will be described later, for example, each updated value is stored by the usage history information collecting unit 11 before the processing proceeds to the sleep processing, like at timing T5, and after menu operation, like at timing T2. The accumulative frequency information I3 obtained in such a manner is stored in the DRAM 172 of the camera body 10, for example. When the power is turned off, like at timing T7, the accumulative frequency information I3 is recorded in the flash ROM 171, similarly to the case of the photography setting information I1. The lens-related information in the accumulative frequency information I3 is extracted by the information extracting unit 13, and is recorded in the flash ROM 260.

Herein, each of the items included in the accumulative frequency information I3 is explained with reference to FIG. 11. The accumulative frequency information I3 has items of release operation, lens change, lens information & subject information, as major classification. Each of the items included in the accumulative frequency information I3 includes a value indicating the accumulative number of times as frequency. The item of release operation has an item of the number of times of performing 2nd release, as minor classification. The item of lens change has an item of the number of times of lens attachment, as a minor category. The item of lens information & subject information has an item of focal distance & subject type, as a minor category.

The data in the item of the number of times of performing 2nd release is stored under the data name 2RL3. 2RL3 has 16 bits as a data length. The accumulative number of times of turning the 2nd release switch on until the updating is performed is stored in 2RL3 as an actual measured value.

The data in the item of the number of times of lens attachment is stored under the data name LEX3. LEX3 has 16 bits as a data length. The accumulative number of times of lens attachment until the updating is performed is stored in LEX3 as an actual measured value.

The data in the item of focal distance & subject type is stored under the data name LFSB. LFSB includes LFSB31, LFSB32, LFSB33, LFSB34, LFSB35, LFSB36, LFSB37, and LFSB38. The accumulative number of times of photographing is stored as LFSB for 8 different subject types included in the SBJ1. For the accumulative number of times of photographing, a data length of 16 bits is prepared, and an actual measured value of the accumulative number of photographing is stored therein. Accordingly, a data length of 128 bits is prepared for storing data of each of the items included in LFSB. The focal distance and the subject type are closely related to each other, and the information, such as how a user performs photographing using the interchangeable lens 20, and what is photographed using the interchangeable lens 20, is one of the most important pieces of information among the usage history information related to the interchangeable lens 20.

The accumulative number of times of photographing for each item included in SBJ1 is LFSB31 if the focal distance is equal to or shorter than 14 mm, LFSB32 if the focal distance is equal to or shorter than 23 mm, LFSB33 if the focal distance is equal to or shorter than 35 mm, LFSB34 if the focal distance is equal to or shorter than 50 mm, LFSB35 if the focal distance is equal to or shorter than 100 mm, LFSB36 if the focal distance is equal to or shorter than 300 mm, LFSB37 if the focal distance is equal to or shorter than 600 mm, and LFSB38 if the focal distance is longer than 600 mm.

The explanation regarding data recording timing continues, with reference back to FIG. 7. If the power is on, the time-series information I4 is continuously obtained at a predetermined time interval. The obtained time-series information I4 is stored in, for example, the DRAM 172. When the power is turned off, like at timing T7, the time-series information I4 is recorded in the flash ROM 171. The time-series information I4 is recorded in a format different from the formats for the operation frequency information I2 and the accumulative frequency information I3, for the purpose of compression storing, etc.; however, the operation frequency information I2 and the accumulative frequency information I3 may be extracted and obtained from the time-series information I4.

Each of the items included in the time-series information I4 is explained with reference to FIG. 12. The time-series information I4 has items of photographing operation and camera operation, as major categories. The item of photographing operation has items of release and EVF, as minor categories. The item of camera operation has an item of power management as a minor category.

The data in each of the items included in the time-series information I4 has 5 bits as a data length, and includes Value 1 indicating a time interval for collecting each of the items included in the time-series information I4 in the unit of seconds, and Value 2 indicating a state at the time when information is obtained. A power index of a power of 2 is stored as Value 1.

The data in the item of release is data indicating the presence/absence of the 1st release operation or the 2nd release operation, and is stored under the data name RLT2. The value 0 is stored as Value 1 in RLT2. Accordingly, RTL2 is stored every second. The value 0 if the release is off, the value 1 if the 1st release is performed, and the value 2 if the 2nd release is performed, is stored as Value 2 of RLT2.

The data in the item of EVF is data indicating whether EVF is displayed or not, and is stored under the data name EVF2. The value 0 is stored in Value 1 of EVF2. Accordingly, EVF2 is stored every second. The value 0 if the EVF is off, the value 1 if the EVF is on, the value 2 if the EVF is compulsorily on, and the value 3 if the EVF is compulsorily off, is stored as Value 2 of EVF2.

The data in the item of power supply management is data indicating the current setting for the power supply management, and is stored under the data name BTL2. The value 4 is stored as Value 1 of BTL2. Accordingly, BTL2 is stored every 16 seconds. The value 0 if the power is on, the value 1 if the monitor is off, the value 2 if the camera is in a sleep mode, and the value 3 if the camera is in a deep sleep mode, is stored as Value 2 of BTL2.

In the present embodiment, the data length of each of the above-described items is allocated as a fixed length. Thus, it is possible to know in advance an amount of data related to information to be stored, and to store relevant and necessary information in an interchangeable lens 20. Furthermore, since the data length is a fixed length and a time required for storing the data is therefore short, it is highly possibly for the camera system 1 according to the present embodiment to store information even when an unexpected operation or situation occurs.

In the present embodiment, the photography setting information I1, the operation frequency information I2, the accumulative frequency information I3, and the time-series information I4 are explained as an example of data obtained by the camera system 1; however, the data obtained by the camera system 1 is not limited thereto. Furthermore, each of the items included in the information is also not limited to the items described above. For each item in any of the information, its content may be changed, added, or deleted as needed, and such changes, etc. may be applied via network, or via a storage medium, such as a distributed CD, etc.

<Operation of Camera System>

Figure 13A:
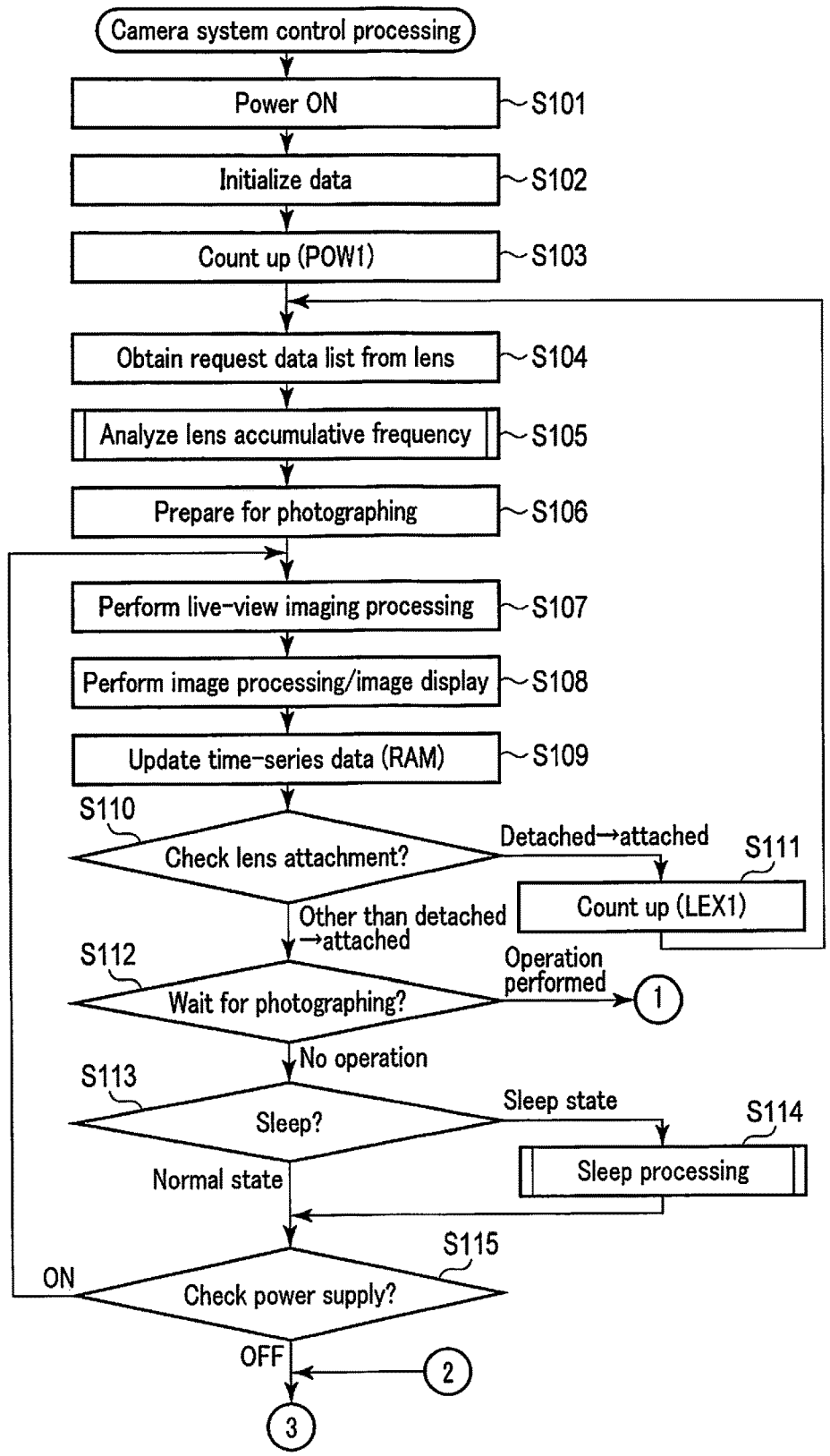
FIG. 13A is a flowchart showing an example of camera system control processing according to the embodiment.
Figure 13B:
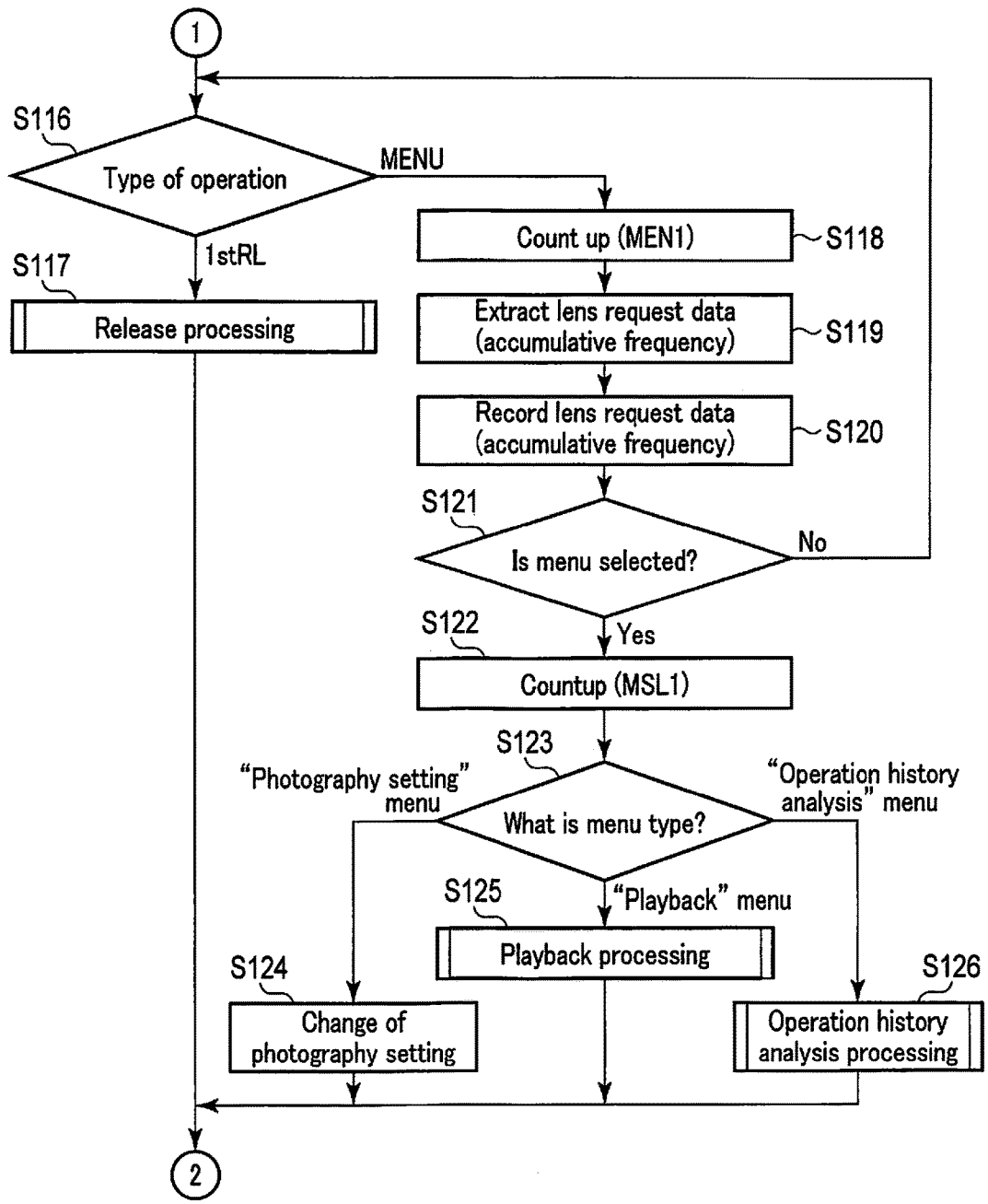
FIG. 13B is a flowchart showing an example of camera system control processing according to the embodiment.

The camera system control processing in the present embodiment will be explained with reference to the flowcharts shown in FIG. 13A to FIG. 13C.

In step S101, the camera body controller 151 turns the power of the camera system 1 on based on, for example, an input at the operation unit 160. The camera system control processing then proceeds to step S102. In step S102, the usage history information collecting unit 11 performs initialization processing on the DRAM 172, for example. The camera system control processing then proceeds to step S103.

In step S103, the usage history information collecting unit 11 updates the number of times of turning the power on/off included in the operation frequency information 12, i.e., the value of POW'. The camera system control processing then proceeds to step S104.

In step S104, the information extracting unit 13 obtains a request data list from the interchangeable lens 20, and stores the list in the DRAM 172 of the camera body 10. The request data list is a list of items included in the lens-related information, and is recorded in, for example, the flash ROM 260 in advance.

An example of the request data list is shown in FIG. 14. As shown in FIG. 14, the request data list includes the items of a focal distance (LFL1), an F number (LAV1), shutter speed (LSS1), a subject type (SBJ1), a subject distance (DST1), a focus mode (FCM1), an IS mode (ISM1), a strobe light (STB1), a monopod/tripod (TRI1), a date & time of photographing (DAT1), the number of times of 2nd release (2RL1), the number of times of lens attachment (LEX1), the number of times of 2nd release (2RL3), the number of times of lens attachment (LEX3), and a plurality of focal distances and subject types (LFSB31, LFSB32, LFSB33, LFSB34). After obtaining the request data list, the camera system control processing proceeds to step S105.

In step S105, the usage history information collecting unit 11 performs lens accumulative frequency analysis processing. The lens accumulative frequency analysis processing is explained with reference to the flowchart shown in FIG. 15. In step S201, the information extracting unit 13 obtains accumulative frequency data included in the request data list, i.e., 2RL3, LEX3, LFSB31, LFSB32, LFSB33, and LFSB34, from the interchangeable lens 20. After obtaining the accumulative frequency data, the lens accumulative frequency analysis processing proceeds to step S202. In step S202, the information extracting unit 13 analyzes accumulative frequency data obtained in step S201. A neural network may be utilized for this analysis. The information extracting unit 13 determines and outputs AE and AF control parameters suitable for a current usage state based on the analysis result. Then, the lens accumulative frequency analysis processing proceeds to step S203. In step S203, the information extracting unit 13 changes the AE and AF control parameters based on a result of the data analysis in step S202. After the change, the lens accumulative frequency analysis processing is finished, and the camera system control processing proceeds to step S106.

The explanation of the camera system control processing continues, with reference back to FIG. 13A. In step S106, the camera body controller 151 prepares for photographing. The preparation for photographing is, for example, to set AE and AF control parameters for live view, and to discharge a charge in the imaging element 111. After finishing the preparation for photographing, the camera system control processing then proceeds to step S107.

In step S107, the camera body controller 151 performs live-view imaging processing. Live-view imaging processing is imaging for displaying a live view. In step S107, the camera body controller 151 causes, for example, the imaging unit 110 to perform imaging. The camera system control processing then proceeds to step S108.

In step S108, the camera body controller 151 causes the imaging processor 130 and the image processor 140 to perform image processing on the image data obtained by the imaging unit 110. A part of the image processing may be performed by the camera body controller 151 or the digital signal processor 152. After the image processing, the camera body controller 151 outputs the image data to the display image processor 181. The display image processor 181 performs processing for live-view display on the image data. The camera body controller 151 causes the electronic viewfinder 182 or the back surface panel 183 to display the processed image data. The camera system control processing then proceeds to step S109.

In step S109, the usage history information collecting unit 11 updates the time-series data, i.e., the values of RLT2, EVF2, and BTL2. The usage history information collecting unit 11 records the time-series data in the flash ROM 171 of the usage history information storage unit 12. The time-series data may be stored in the DRAM 172 of the usage history information storage unit 12. The camera system control processing then proceeds to step S110.

In step S110, the camera body controller 151 checks whether the lens is attached. In the lens attachment check, the camera system control processing proceeds to step S111 if it is determined that a state in which the interchangeable lens 20 is not attached is changed to a state in which the lens is attached; in other cases, for example, in a case of determining that the interchangeable lens 20 is still attached or not attached (other than detached to attached), the processing proceeds to step S112.

In step S111, the usage history information collecting unit 11 updates the value of LEX1 and stores the value in the DRAM 172 of the usage history information storage unit 12. The camera system control processing then returns to step S104, and the repeated processing from step S104 to step S110 is repeated until it is not determined in step S110 that a state in which the interchangeable lens 20 is not attached is changed to a state in which the interchangeable lens 20 is attached.

In step S112, the camera body controller 151 determines whether or not the camera is on standby for photographing based on, for example, an output from the operation unit 160. If no operation is input from a user, in other words, if the camera is on standby for photographing, for example when the camera body controller 151 does not detect an output at the operation unit 160, the camera system control processing proceeds to step S113; in other cases, for example, if an operation is input from a user, the processing proceeds to step S116.

In step S113, the camera body controller 151 determines whether the camera body 10 should be shifted to the sleep state or not. The camera body controller 151 determines to shift the camera body 10 to the sleep state when the repeated processing between step S107 and later-described step S115 is repeated for a predetermined length of time, or a predetermined number of times. The camera system control processing proceeds to step S114 if it is determined that the processing is shifted to the sleep state; if not shifted to the sleep state, in other words, if the processing from step S107 and step S115 is repeated under a normal state, the processing proceeds to step S115.

In step S114, the camera body controller 151 performs sleep processing to shift the camera body 10 to the sleep state. The sleep processing is explained with reference to the flowchart shown in FIG. 16.

In step S301, the information extracting unit 13 extracts accumulative frequency data included in a request data list from the usage history information storage unit 12. Accordingly, 2RL3, LEX3, LFSB31, LFSB32, LFSB33, and LFSB34 are extracted at this time. After extracting the accumulative frequency data, the sleep processing proceeds to step S302.

In step S302, the information extracting unit 13 records the accumulative frequency data extracted from the usage history information storage unit 12 in step S301 in the flash ROM 260 of the lens-related information storage unit 21. After recording the accumulative frequency data, the sleep processing proceeds to step S303.

In step S303, the camera body controller 151 shifts the camera body 10 to the sleep state. The sleep processing proceeds to step S304.

In step S304, the camera body controller 151 determines whether a user's operation is input or not based on an output from the operation unit 160. If no user's operation is input, in other words, if the camera body controller 151 does not detect an output from the operation unit 160, the determination in step S304 is repeated, and if a user's operation is input, in other words, if the camera body controller 151 detects an output at the operation unit 160, the sleep processing is finished, and the processing proceeds to step S115 of the camera system control processing. In other words, in the above-described sleep processing, the accumulative frequency data included in the lens-related information extracted in step S301 is recorded in the lens-related information storage unit 21 immediately before the camera system 1 is shifted to the sleep state in step S303.

In the camera system 1 according to the present embodiment, a fixed data length is allocated to each information obtained by the usage history information collecting unit 11. Furthermore, relevant and necessary items are set in advance for the lens-related information recorded in the interchangeable lens 20. The items extracted and recorded in the sleep processing according to the present embodiment, in particular, are further limited to the accumulative frequency information I3. For this reason, the camera system 1 can shorten the time required for recording the lens-related information in the above-described sleep processing, and even when an unexpected interruption occurs during the sleep processing due to a user's operation, etc., the information can be recorded.

The explanation of the camera system control processing continues, with reference back to FIG. 13A. In step S115, the camera body controller 151 determines whether or not the power should be turned off. It is determined that the power should be turned off when, for example, a user operates a power button, in other words, when the camera body controller 151 detects a control signal to turn the power off which is output from the operation unit 160, and the like. The camera system control processing proceeds to step S127 if it is determined to turn the power off; if not determined, the processing returns to step S107 and the processing between step S107 and step S115 is repeated.

In step 116, for example, after the camera body controller 151 detects a user's operation in step S112, etc., the camera body controller 151 determines which operation the user performs. If a 1st release operation is detected by the camera body controller 151, the camera system control processing proceeds to step S117; if a menu operation is detected by the camera body controller 151, the processing proceeds to step S118.

Figure 17:
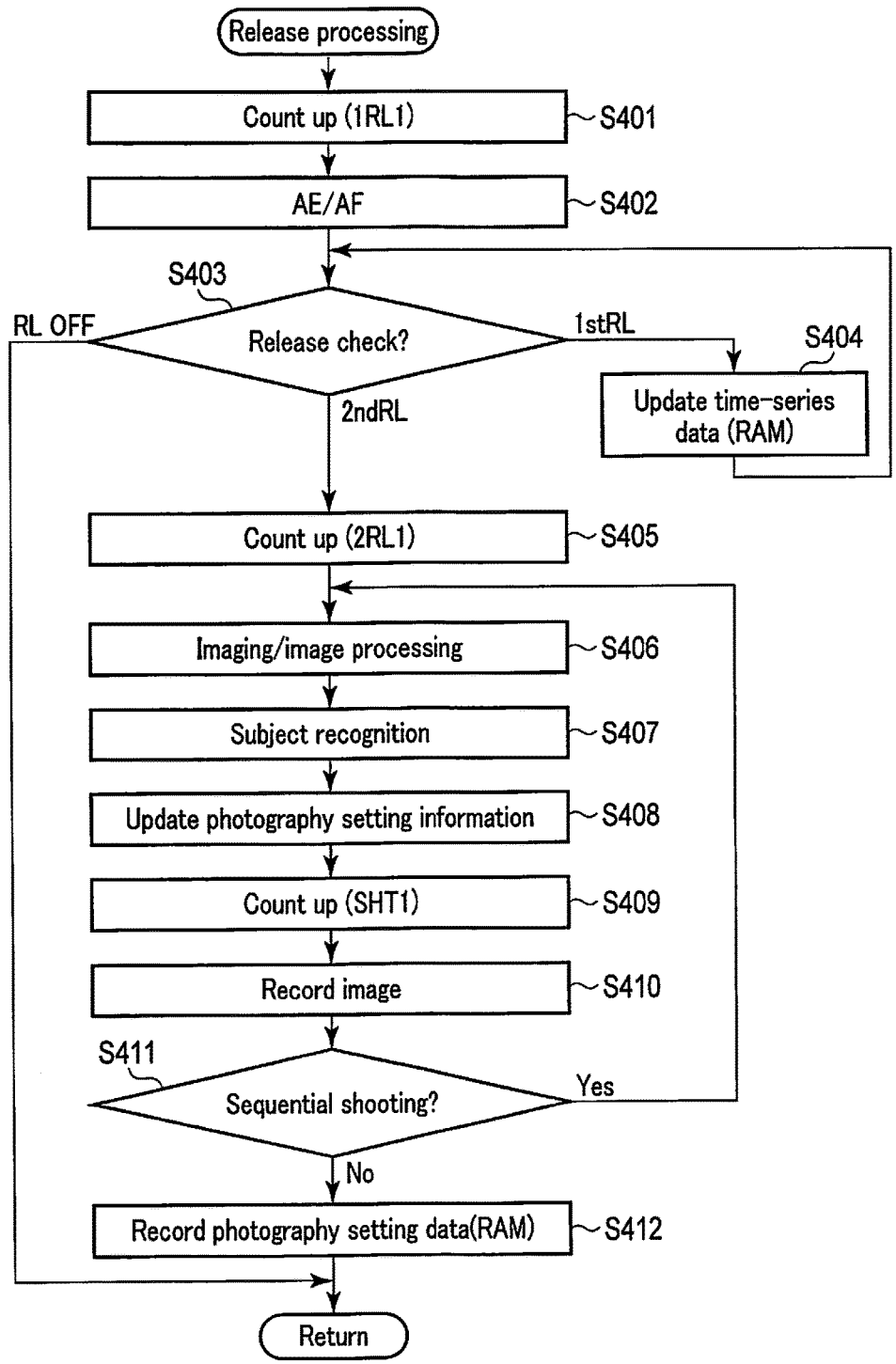
FIG. 17 is a flowchart showing an example of release processing according to the embodiment.

In step S117, the camera body controller 151 performs release processing. The release processing is explained with reference to the flowchart shown in FIG. 17.

In step S401, the usage history information collecting unit 11 updates the value of 1RL1. The updated 1RL1 is stored in the DRAM 172 of the usage history information storage unit 12. After storing 1RL1, the release processing proceeds to step S402.

In step S402, the camera body controller 151 sets AE/AF control parameters used for photographing. After the setting, the release processing proceeds to step S403.

In step S403, the camera body controller 151 determines whether the release button is pressed or not. If the release button is not pressed, in other words, the 1st release is canceled, the release processing is finished, and the processing proceeds to step S115 of the camera system control processing. If the 1st release button is pressed, the release processing proceeds to step S404. If the 2nd release button is pressed, the release processing proceeds to step S405.

In step S404, the usage history information collecting unit 11 obtains time-series data and stores it in the DRAM 172 of the usage history information storage unit 12. Thereafter, the release processing returns to step S403. While the 1st release button is being pressed, the processing between step S403 and S404 is repeated.

In step S405, the usage history information collecting unit 11 updates a value of 2RL1 and stores the value in the DRAM 172 of the usage history information storage unit 12. After the storing, the release processing proceeds to step S406.

In step S406, the camera body controller 151 performs imaging and image processing. The camera body controller 151 operates the imaging unit 110 and the sensor shift unit 120 to perform imaging, and obtains image data. After the imaging, the camera body controller 151 causes the imaging processor 130 and the image processor 140 to perform image processing on the image data. The image processing may be performed by the camera body controller 151 or the digital signal processor 152. After the image processing, the release processing proceeds to step S407.

In step S407, the camera body controller 151 causes the digital signal processor 152 to perform subject recognition. Subject recognition may be performed using, for example, a neural network which is constructed in the digital signal processor 152 in advance and is learned. A subject to be recognized is based on the subject types SBJ1 and SBJ2 included in the subject information, which is described above with reference to FIG. 8 and FIG. 9. The subject recognition may be performed by the camera body controller 151. When sequential shooting is performed, subject recognition is performed based on the last image data obtained in the sequential shooting. On the other hand, subject recognition may be performed for each image data obtained by sequential shooting so that a subject type can be determined when the subject is changed during sequential shooting. Thereafter, the release processing proceeds to step S408.

In step S408, the camera body controller 151 updates a value in each of the items included in the photography setting information I1 including the subject information recognized in step S407. The items included in the photography setting information I1 are as described above with reference to FIG. 8. Thereafter, the release processing proceeds to step S409.

In step S409, the usage history information collecting unit 11 updates a value of SHT1 which is the information about the number of photographed images included in the operation frequency information I2. The usage history information collecting unit 11 stores the updated SHT1 in the DRAM 172 of the usage history information storage unit 12. After the storing, the release processing proceeds to step S410.

In step S410, the camera body controller 151 records the obtained image data on which image processing has been performed in the flash ROM 171 or in the DRAM 172. After the recording or storing, the release processing proceeds to step S411.

In step S411, the camera body controller 151 determines whether the sequential shooting is completed or not. If it is determined that sequential shooting is not completed, the release processing proceeds to step S406, and the next photographing is performed. If it is determined that the photographing is not sequential shooting or the sequential shooting is completed, the release processing proceeds to step S412.

In step S412, the usage history information collecting unit 11 obtains photography setting data, and stores it in the DRAM 172 of the camera body 10. The items included in the photography setting data are as described above with reference to FIG. 8. After the storing, the release processing is finished, and the processing proceeds to step S115 of the camera system control processing.

The explanation of the camera system control processing continues, with reference back to FIG. 13B. Step S118 is a case where the user's operation detected by the camera body controller 151 in step S116 is a menu operation. In step S118, the usage history information collecting unit 11 updates a value of MEN1, which is the number of times of menu display, included in the operation frequency information 12, and stores the updated MEN1 in the DRAM 172 of the usage history information storage unit 12. After the storing, the camera system control processing then proceeds to step S119.

In step S119, the information extracting unit 13 extracts accumulative frequency information I3 included in the request data list in a manner similar to step S301 of the sleep processing, which is explained above with reference to FIG. 16. After extracting the information, the camera system control processing then proceeds to step S120.

In step S120, the information extracting unit 13 records the accumulative frequency data extracted in step S119 in the flash ROM 260 of the lens-related information storage unit 21. In other words, in the present embodiment, after a user performs an operation other than the release operation in step S116, such as an operation of menu selecting, the accumulative frequency information I3 extracted in step S119 is recorded in the lens-related information storage unit 21. After storing the information, the camera system control processing proceeds to step S121.

In step S121, the camera body controller 151 determines whether or not a menu selection is performed. If the camera body controller 151 detects a menu selection operation by a user, the camera system control processing proceeds to step S122; if not detected, the processing proceeds to step S116.

In step S122, the usage history information collecting unit 11 updates a value of MSL1, which is data indicating the number of times of menu selection, and stores the value in the DRAM 172 of the usage history information storage unit 12. After the storing, the camera system control processing then proceeds to step S123.

In step S123, the camera body controller 151 determines which operation is the operation performed by a user in step S121. If the user's operation is the "photography setting" menu, the camera system control processing proceeds to step S124; if the user's operation is the "playback" menu, the process proceeds to step S125; and if the user's operation is the "operation history analysis" menu, the processing proceeds to step S126.

In step S124, the camera body controller 151 changes the photography setting based on an input signal related to content of the user's operation that is output from the operation unit 160. After the change, the camera system control processing then proceeds to step S115.

In step S125, the camera body controller 151 performs playback processing. The playback processing is explained with reference to the flowchart shown in FIG. 18.

In step S501, the camera body controller 151 performs image playback. At the time of image playback, the camera body controller 151 may display the image data which is selected by a user on the electronic viewfinder 182 or the back surface panel 183, or outputs the image data to a display device provided outside of the camera body 10 via an HDMI standard-compliant I/F 191 or a Wi-Fi standard-compliant I/F 194. Thereafter, the playback processing proceeds to step S502.

In step S502, the usage history information collecting unit 11 updates a value of PRV1, which is data indicating the number of times of playback display, and stores the value in the DRAM 172 of the usage history information storage unit 12. After the storing, the playback processing proceeds to step S503.

In step S503, the camera body controller 151 determines which operation a user performed. For example, if a user operates nothing for a predetermined period of time, or if a user selects to finish image playback, the playback processing is finished, and the processing proceeds to step S115 of the camera system control processing. The playback processing is, for example, when a user plays back data obtained by sequential shooting or movie shooting, and the processing proceeds to step S504 if frame advance is selected.

In step S504, the camera body controller 151 displays image data obtained after obtaining the image data on, for example, the electronic viewfinder 182 or the back surface panel 183. Thereafter, the playback processing proceeds to step S505.

In step S505, the usage history information collecting unit 11 updates a value of FSL1 which is data indicating the number of times of frame advance, and stores the value in the DRAM 172 of the usage history information storage unit 12. After the storing, the playback processing returns to step S503.

Herein, the explanation of the camera system control processing continues, with reference back to FIG. 13B again. In step S126, the camera body controller 151 performs operation history analysis processing. The operation history analysis processing is explained with reference to the flowchart shown in FIG. 19. In step S601, the information extracting unit 13 obtains all data that is recorded and accumulated in the lens-related information storage unit 21 of the interchangeable lens 20. The obtained data is stored in, for example, the DRAM 172. Subsequently, the processing proceeds to step S602. In step S602, the camera body controller 151 analyzes the data obtained in step S601 to use in the camera body 10, for example. A neural network that is established in the digital signal processor 152, for example, may be utilized for this analysis. The information extracting unit 13 determines and outputs AE and AF control parameters suitable for a current usage state based on the analysis result. Subsequently, the processing proceeds to step S603. In step S603, the information extracting unit 13 changes the AE and AF control parameters based on a result of the data analysis in step S602. After the change, the operation history analysis processing is finished, and the camera system control processing proceeds to step S115.

Herein, the explanation of the camera system control processing continues, with reference back to FIG. 13C again. After the above-described steps S113, S114, S117, and S124 through S126, the camera body controller 151 checks a power supply in step S115. If the camera body controller 151 determines that the camera system 1 is in an on state, and a user does not perform an operation to turn the power off, the processing returns to step S107, and the camera system control processing after the above-described step S104 is repeated. If the camera body controller 151 detects a user's operation to turn the power off, or determines that the camera system 1 has already been turned off, the processing proceeds to step S127, and the processing related to the power turn-off process is executed.

In step S127, the usage history information collecting unit 11 records the time-series data in the flash ROM 171 of the usage history information storage unit 12. After the recording, the camera system control processing then proceeds to step S128.

In step S128, the usage history information collecting unit 11 records the obtained photography setting information I1 in the flash ROM 171 of the usage history information storage unit 12 in a manner similar to step S127. After the recording, the camera system control processing then proceeds to step S129.

In step S129, the usage history information collecting unit 11 records the obtained operation frequency information I2 in the flash ROM 171 of the usage history information storage unit 12, in a manner similar to step S127. After the recording, the camera system control processing then proceeds to step S130.

In step S130, the usage history information collecting unit 11 records the obtained accumulative frequency information I3 in the flash ROM 171 of the usage history information storage unit 12 in a manner similar to step S127. After the recording, the camera system control processing then proceeds to step S131.

In step S131, the information extracting unit 13 extracts the lens-related information in accordance with the request data list from the flash ROM 171 of the usage history information storage unit 12. After extracting the lens-related information, the camera system control processing then proceeds to step S132.

In step S132, the information extracting unit 13 records the lens-related information that is extracted in step S131 in the lens-related information storage unit 21, i.e., the flash ROM 260. In other words, in the present embodiment, for example, after a user's instruction to turn off the power of the camera system 1 and after a user instructs to display a menu to change the setting of the camera system 1, the extracted lens-related information is recorded in the lens-related information storage unit 21. After storing the lens-related information, the camera system control processing is finished.

<Features of Camera System>

The camera system 1 according to the present embodiment includes a lens-changeable camera body 10 and an interchangeable lens 20. The camera system 1 collects a plurality of usage history information related to its usage state, and uses the collected usage history information to improve controlling, etc.

The camera system 1 according to the present embodiment includes a usage history information collecting unit 11 which collects the usage history information and a usage history information storage unit 12 which stores the usage history information. Items and a data length of the information recorded in the interchangeable lens 20 are determined in advance in consideration of the capacity of the data recorded therein and a time required for recording. The information recorded in the interchangeable lens 20 is called lens-related information. The lens-related information is extracted by the information extracting unit 13 from the usage history information recorded or stored in the usage history information storage unit 12, and is recorded in the lens-related information storage unit 21.

The camera system 1 according to the present embodiment is not limited to the combination of the camera body 10 and the interchangeable lens 20, and may include other accessories. For example, when the interchangeable lens 20 is shared by a plurality of camera bodies, the lens-related information recorded therein may be transferred to a camera body 10 to which the interchangeable lens 20 is attached, and may be used. Furthermore, the lens-related information newly collected by the camera body 10 is accumulated.

Thus, the lens-related information extracted by the information extracting unit 13 includes information regarding how a user perform photographing using the interchangeable lens 20 and what is photographed using the interchangeable lens 20, and so on. In other words, the lens-related information includes at least focal distance information and subject type information which are used for photographing. The information is closely related to each other, and is essential for presenting a better use of a product, improving performance, and recommending product purchase. For this reason, the information extracting unit 13 correlates and extracts the focal distance information and the subject type information. The lens-related information may further include frequency information related to a user's operation. It is possible to know a user's habits in photographing from such frequency information.

The camera system 1 according to the present embodiment determines subject type information by information processing using a neural network constructed in a digital signal processor 152. Data in information processing using such a neural network may refer to a destination inside the camera system 1, or to an external destination that can be connected to via a communication network, such as the Internet.

In the camera system 1 according to the present embodiment, the camera body 10 includes a usage history information collecting unit 11, a usage history information storage unit 12, and an information extracting unit 13, and the interchangeable lens 20 includes a lens-related information storage unit 21.

In the present embodiment, timing when the lens-related information is recorded in the lens-related information storage unit 21 is predetermined. The timing is, for example, after a user performs an operation other than a release operation, for example, operating a menu, after a user instructs to turn off the power of the camera system 1, after a user instructs to display a menu to change the setting of the camera system 1, and immediately before the camera system 1 is shifted to a sleep state.

In the present embodiment, the items included in the lens-related information are predetermined. A data length for each of the items included in the information is a fixed length that is allocated in advance. For this reason, the camera system 1 can immediately record the lens-related information in the lens-related information storage unit 21, and the data capacity of the lens-related information would not exceed a predetermined value. On the other hand, the information recorded in the flash ROM 171 of the usage history information storage unit 12 may include data having a variable length. Accordingly, the recording of information in the flash ROM 171 of the usage history information storage unit 12 is performed after a user instructs to turn off the power of the camera system 1 to secure a sufficient time for recording.

In the present embodiment, items or content, etc. of the above-described usage history information, lens-related information, and subject type information may be changed as needed. Needless to say, the items or content can be added or deleted.

<Modifications>

In the above-described embodiment, one interchangeable lens 20 is shared by a plurality of camera bodies. Lens-related information collected and recorded when the interchangeable lens 20 is attached to each camera body is accumulated in the interchangeable lens 20 and may be used. On the other hand, the camera system 1 may be configured in such a manner that a plurality of interchangeable lenses are attached to one camera body 10. In also this case, similar to the above-described embodiment, usage history information is shared.

Figure 2:
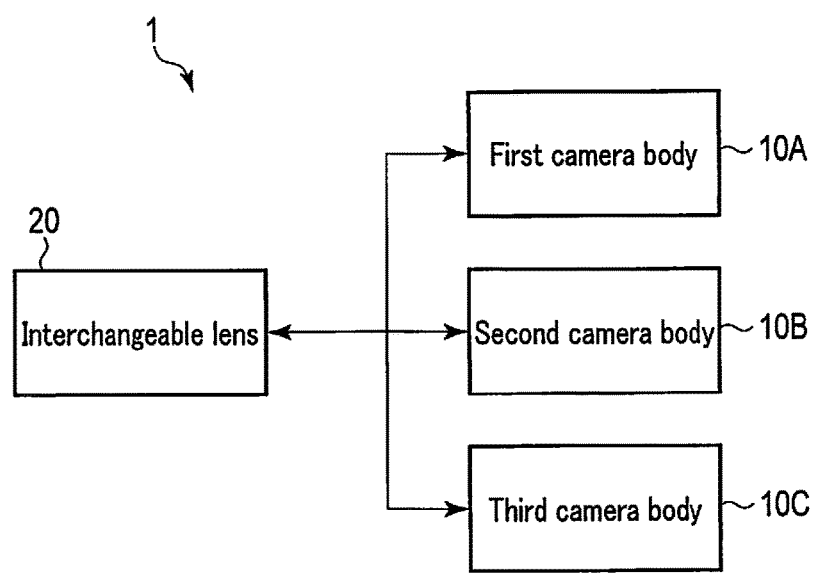
FIG. 2 is a conceptual diagram to explain a concept of a use of an interchangeable lens camera system according to the embodiment.

Similar to the above-described example with reference to the conceptual drawings in FIGS. 1 and 2, a strobe-related information storage unit may be provided in the strobe light 30. In this case, information related to the operation and setting of the strobe light 30, that is, strobe-related information, is recorded in the strobe-related information storage unit. The strobe-related information is, for example, information regarding whether the strobe light 30 is used or not, the number of illuminated strobe lights 30, exposure at the time of photographing, a subject type, and a guide number, etc. The information extracting unit 13 extracts strobe-related information from the information obtained by the usage history information collecting unit 11 and stored or recorded by the usage history information storage unit 12. The strobe-related information storage unit may include, for example, a flash ROM 340. Such data communication between the camera body 10 and the strobe light 30 is performed through the strobe light I/F 350 and the second external accessory I/F 196.

If the strobe light 30 is shared by a plurality of camera bodies, information obtained by the plurality of camera bodies is accumulated in the strobe light 30. The strobe-related information recorded in the strobe-related information storage unit is transferred to the camera body 10 to which the strobe light 30 is attached, similar to the case of the above-described interchangeable lens 20, and the information is used to improve operation and control of the camera system 1 including the camera body 10.

The example in which information related to the interchangeable lens 20 and the strobe light 30 is accumulated respectively in the interchangeable lens 20 and the strobe light 30 has been explained above; however, the embodiment is not limited to the example. An accessory may be ones according to the camera system 1 and having an accessory-related information storage unit for recording information related to the accessory. Such accessories include, for example, the above-described interchangeable lens 20 and strobe light 30. The accessories may further include a teleconverter, etc. For example, the camera body 10 may have a plurality of external accessory I/F (interfaces) so as to be connectible to these accessories. The teleconverter may be arranged between the camera body 10 and the interchangeable lens 20, for example. The teleconverter-related information is, for example, whether the teleconverter is attached or not, a focal distance of the interchangeable lens 20 which is attached at the time of photographing, a scaling factor of the used teleconverter, and a subject type, etc. Similar to the above-described embodiment, the usage history information related to each of the accessories, i.e., accessory-related information, is extracted by the information extracting unit 13 from the usage history information collected by the usage history information collecting unit 11, and is recorded. Any modification like the above-described embodiment functions similarly to the above-described embodiment, and the information accumulated in a modification can be utilized similarly to the information accumulated in the embodiment.

An embodiment wherein the camera body 10 has a usage history information collecting unit 11, a usage history information storage unit 12, and an information extracting unit 13, and the interchangeable lens 20 has a lens-related information storage unit 21 has been explained heretofore; however, the embodiment is not limited thereto. The interchangeable lens 20 may have any one of, or any combination of, or all of the usage history information collecting unit 11, the usage history information storage unit 12, the information extracting unit 13, and the lens-related information storage unit 21. For example, the interchangeable lens 20 having the usage history information collecting unit 11, the usage history information storage unit 12, the information extracting unit 13, and the lens-related information storage unit 21 may perform collection of usage history information, extraction of lens-related information, recording of lens-related information, and so on. Such an interchangeable lens 20 may be connected to a device having imaging elements, such as a smart phone, etc., and used. Similarly, an accessory according to the above-described camera system 1 may have any one of, or any combination of, or all of the usage history information collecting unit 11, the usage history information storage unit 12, the information extracting unit 13, and the accessory-related information storage unit. For example, an accessory having the usage history information collecting unit 11, the usage history information storage unit 12, the information extracting unit 13, and the accessory-related information storage unit may perform collecting usage history information, extracting accessory-related information, recording accessory-related information, and so on.

The order of each processing shown in the flowcharts, and each step in each processing may be changed. It goes without saying that the items or content can be added or deleted. Each processing is executed by a program stored in the flash ROM 171, the flash ROM 260, and the flash ROM 340, etc. Each program may be internally recorded in the camera system 1 in advance, or may be externally recorded in a separate recording medium. The programs can be recorded in the camera system 1 or the separate recording medium in various ways. They may be recorded at the time of shipping a product, they can be recorded using a distributed recording medium, or they can be downloaded using a communication network, such as the Internet.

The technology according to the present embodiment includes a control method for controlling the operation of the above-described camera system 1, and a control program to cause a computer to execute the above-described operation of the camera system 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera system, comprising a lens-changeable camera body and an interchangeable lens, the camera system including:
    a usage history information collecting unit configured to collect a plurality of usage history information related to a usage state of the camera system;
    a usage history information storage unit configured to store the collected usage history information;
    an information extracting unit configured to extract, from a plurality of the usage history information stored in the usage history information storage unit, usage history information related to the interchangeable lens being attached; and
    a lens-related information storage unit configured to store the extracted usage history information related to the interchangeable lens.

2. The camera system according to claim 1, wherein the usage history information extracted by the information extracting unit includes at least focal distance information and subject type information used for photographing.

3. The camera system according to claim 2, wherein the information extracting unit correlates and extracts the focal distance information and the subject type information.

4. The camera system according to claim 1, wherein the interchangeable lens includes the lens-related information storage unit.

5. The camera system according to claim 1, wherein the camera body includes the usage history information collecting unit, the usage history information storage unit, and the information extracting unit.

6. The camera system according to claim 1, wherein the lens-related information storage unit stores the extracted usage history information after a user performs an operation other than a release operation.

7. The camera system according to claim 1, wherein the lens-related information storage unit stores the extracted usage history information after a user instructs to turn off a power of the camera system.

8. The camera system according to claim 6, wherein the extracted usage history information stored by the lens-related information storage unit is data having a fixed length.

9. The camera system according to claim 1, wherein the lens-related information storage unit stores the extracted usage history information after a user instructs to display a menu for changing a setting of the camera system.

10. The camera system according to claim 1, wherein the lens-related information storage unit stores the extracted usage history information immediately before the camera system is shifted to a sleep state.

11. The camera system according to claim 1, wherein the usage history information extracted by the information extracting unit includes at least information related to a frequency of an operation.

12. A camera to which an interchangeable lens including a lens-related information storage unit configured to store usage history information related to the interchangeable lens is attached, the camera being included in a camera system and including:
    a usage history information collecting unit configured to collect a plurality of usage history information related to a usage state of the camera system;
    a usage history information storage unit configured to store the collected usage history information; and
    an information extracting unit configured to extract usage history information related to the interchangeable lens from a plurality of the usage history information stored in the usage history information storage unit.

13. An interchangeable lens being included in a camera system, the interchangeable lens being attached to a camera body and including:
    a usage history information collecting unit configured to collect a plurality of usage history information related to a usage state of the camera system;
    a usage history information storage unit configured to store the collected usage history information;
    an information extracting unit configured to extract usage history information related to the interchangeable lens from a plurality of the usage history information stored in the usage history information storage unit; and
    a lens-related information storage unit configured to store the extracted usage history information related to the interchangeable lens.

14. An interchangeable lens being included in a camera system by being attached to a camera body, the camera body including:
    a usage history information collecting unit configured to collect a plurality of usage history information related to a usage state of a camera system;
    a usage history information storage unit configured to store the collected usage history information; and
    an information extracting unit configured to extract usage history information related to an interchangeable lens from a plurality of the usage history information stored in the usage history information storage unit,
    the interchangeable lens including a lens-related information storage unit configured to store the extracted usage history information related to the interchangeable lens.

15. A computer-readable non-transitory storage medium storing a control program for controlling a camera system including a camera body to which an interchangeable lens can be attached and the interchangeable lens, the control program causing a computer to execute:
    collecting a plurality of usage history information related to a usage state of the camera system;
    storing the collected usage history in the information storage unit;
    extracting, from a plurality of the usage history information stored in the usage history information storage unit, usage history information related to the interchangeable lens being attached; and
    storing the extracted usage history information related to the interchangeable lens.

* * * * *